(12) United States Patent
Mauk et al.

(10) Patent No.: US 9,409,166 B2
(45) Date of Patent: Aug. 9, 2016

(54) INTEGRATED PCR REACTOR FOR CELL LYSIS, NUCLEIC ACID ISOLATION AND PURIFICATION, AND NUCLEIC ACID AMPLICATION RELATED APPLICATIONS

(75) Inventors: Michael G Mauk, Greenville, DE (US); Haim H Bau, Swarthmore, PA (US); Daniel Malamud, New York, NY (US); William Abrams, Merion, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 1010 days.

(21) Appl. No.: 12/331,508

(22) Filed: Dec. 10, 2008

(65) Prior Publication Data

US 2009/0186357 A1 Jul. 23, 2009

Related U.S. Application Data

(60) Provisional application No. 61/012,667, filed on Dec. 10, 2007.

(51) Int. Cl.
*B01L 3/00* (2006.01)
*B01L 7/00* (2006.01)

(52) U.S. Cl.
CPC ...... *B01L 3/5027* (2013.01); *B01J 2219/00529* (2013.01); *B01J 2219/00608* (2013.01); *B01J 2219/00641* (2013.01); *B01J 2219/00659* (2013.01); *B01J 2219/00722* (2013.01); *B01L 3/502707* (2013.01); *B01L 7/52* (2013.01); *B01L 2200/12* (2013.01); *B01L 2200/16* (2013.01); *B01L 2300/0681* (2013.01); *B01L 2300/0816* (2013.01); *B01L 2300/0867* (2013.01); *B01L 2400/0655* (2013.01); *B01L 2400/0677* (2013.01)

(58) Field of Classification Search
CPC ............... B01L 3/5027; B01J 2219/00722; C12Q 1/6883
USPC ................................................. 435/91.2
See application file for complete search history.

(56) References Cited

U.S. PATENT DOCUMENTS

| | | | | |
|---|---|---|---|---|
| 5,552,325 A | * | 9/1996 | Nochumson et al. | 436/177 |
| 5,955,351 A | * | 9/1999 | Gerdes et al. | 435/287.2 |
| 6,783,993 B1 | * | 8/2004 | Malmquist | 436/177 |
| 2002/0119482 A1 | * | 8/2002 | Nelson et al. | 435/6 |
| 2005/0202504 A1 | * | 9/2005 | Anderson et al. | 435/6 |

FOREIGN PATENT DOCUMENTS

| | | | |
|---|---|---|---|
| WO | WO9600301 | * | 1/1996 |
| WO | WO 03/106031 | * | 12/2003 |

* cited by examiner

*Primary Examiner* — Betty Forman
(74) *Attorney, Agent, or Firm* — Baker & Hostetler LLP

(57) ABSTRACT

Disclosed are integrated devices capable of performing a polymerase chain reaction within a single vessel. Also disclosed are related methods of sample analysis.

30 Claims, 27 Drawing Sheets

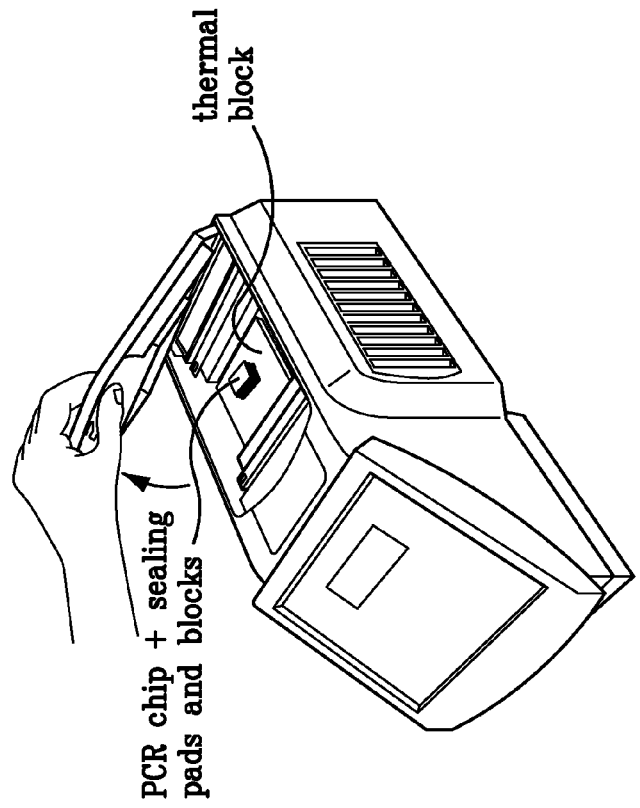
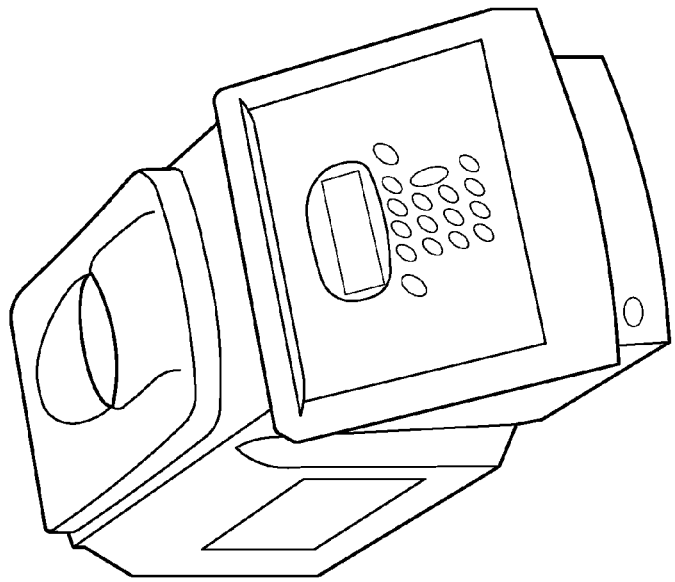

Chip 1  Chip 2 polycarbonate film: 0.75mm thick
PCR chamber volume: 20μl
membrane diameter: 5mm FIG. 21 Lab-on-a-Chip PCR Processing Routes

US 9,409,166 B2

INTEGRATED PCR REACTOR FOR CELL LYSIS, NUCLEIC ACID ISOLATION AND PURIFICATION, AND NUCLEIC ACID AMPLICATION RELATED APPLICATIONS

CROSS-REFERENCE TO RELATED APPLICATIONS

This application claims the benefit of U.S. Application Ser. No. 61/012,667, filed Dec. 10, 2007, the entirety of which is incorporated by reference herein.

STATEMENT OF GOVERNMENT RIGHTS

The U.S. government may have certain rights in the claimed invention. At least a portion of the work underlying the claimed invention was supported by funding from the National Institutes of Health, grant number NIH/NIDCR UO1DE01785.

FIELD OF THE INVENTION

The claimed invention relates to the field of diagnostic devices. The claimed invention also relates to the field of microscale chemical reactors.

BACKGROUND OF THE INVENTION

A number of clinical diagnostics and biotechnology processes utilize enzymatic amplification of nucleic acids. In particular, the polymerase chain reaction (PCR) is routinely used to produce multiple copies of sequence-specific nucleic acid molecules in order to facilitate their detection, sequencing, or cloning. As an example, viral and bacteria pathogens are detected in blood and saliva samples by amplifying nucleic acid sequences specific to those pathogens and assaying any amplification product using fluorescence detection. Thus, for a wide range of clinical and non-clinical applications, PCR-based assays are the assay of choice because of their sensitivity and specificity.

Compared to other assays (e.g., immunoassays), however, PCR-based processes are tedious, time consuming, resource-intensive, prone to contamination, and labor intensive. PCR-based assays also require a high level of operator skill and experience. Accordingly, there is a need in the art for devices and methods capable of performing PCR-based processes in an efficient manner that reduces the resources—in terms of both materials and labor—required to effect a PCR-based process and to enable multiplexed detection of multiple nucleic acid targets.

SUMMARY OF THE INVENTION

In meeting the described challenges, the present invention provides microfluidic chips, comprising: a chamber disposed on a substrate, the chamber comprising an inlet having an effective cross-sectional diameter in the range of from about 1 to about 10,000 microns, and the chamber comprising an outlet, a nucleic acid concentrator disposed within the chamber, the nucleic acid concentrator being porous, the nucleic acid concentrator being positioned within the chamber such that the nucleic acid concentrator is in fluid communication with the inlet, the outlet, or both; and the nucleic acid concentrator being capable of preferentially and reversibly binding a nucleic acid.

The present invention also provides methods for analyzing a cell-containing sample, comprising: performing, within a chamber disposed on a substrate, at least the steps of: introducing the cell-containing sample into the chamber by way of an inlet comprising an effective cross-sectional dimension in the range of from about 1 to about 10,000 micron; lysing one or more cells of the cell-containing sample so as to liberate a nucleic acid from the sample, preferentially binding a nucleic acid to a nucleic acid concentrator residing within the chamber; eluting the nucleic acid from the element; and amplifying the nucleic acid.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings:

FIG. 10 illustrates a commercial thermal cycler;

DETAILED DESCRIPTION OF ILLUSTRATIVE EMBODIMENTS

Figure 1:
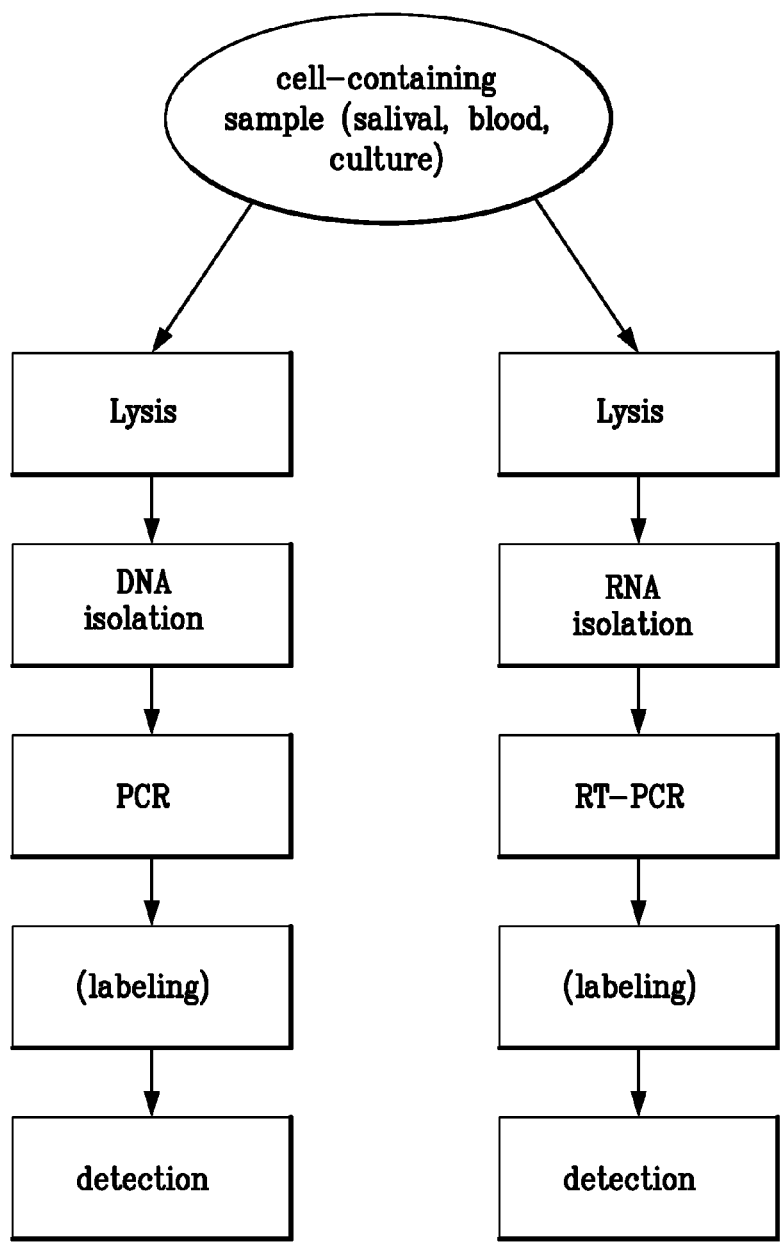
FIG. 1 depicts processing steps for nucleic acid (DNA or RNA) based testing using PCR for DNA targets and RT-PCR for RNA targets.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

In one aspect, the present invention provides a microfluidic chip, comprising a chamber disposed on a substrate, the chamber comprising an inlet having an effective cross-sectional diameter in the range of from about 1 to about 10,000 microns, and the chamber comprising an outlet, a nucleic acid concentrator disposed within the chamber, the nucleic acid concentrator being porous, the nucleic acid concentrator being positioned within the chamber such that the nucleic acid concentrator is in fluid communication with the inlet, the outlet, or both; and the nucleic acid concentrator being capable of preferentially and reversibly binding a nucleic acid. In some embodiments, the microfluidic chip is capable of all steps of a polymerase chain reaction performed on a cellular sample.

The inlet suitably has a cross-sectional dimension in the range of from about 10 to about 1000 microns, or in the range of from about 50 to about 200 microns. The outlet has a cross-sectional dimension in the range of from about 1 to about 10,000 microns, or in the range of from about 10 to about 1000 microns, or in the range of from about 50 to about 500 microns.

In some embodiments, the chamber includes comprises an observation port. Such a port is constructed to as to allow visual inspection of the contents of the chamber. As an example, such a port would be used to inspect for the presence of a fluorescently labeled molecule. Alternatively, the port may be used to inspect for radioactive, magnetic, or electrical signals, as well.

Suitable substrate materials include a polymer, a metal, a metal oxide, a ceramic, a glass, or any combination thereof. Polycarbonate is considered especially suitable. Chambers may have many different shapes—depressions, channels, conduits, blisters, and the like are all suitable forms for chambers.

The chip suitably includes one or more valves, positioned so as to be capable of modulating fluid flow within the chamber. Such a valve might be positioned midway within the chamber so as to modulate fluid flow between regions of the chamber. Valves may also be used to modulate fluid flow across the inlet, the outlet, or both.

Nucleic acid concentrators are membranes in some embodiments, although monoliths and other forms are all acceptable. In some embodiments, the membrane spans the cross-section of the chamber in order that fluid passing through the chamber contacts the membrane, and any nucleic acid residing within that fluid will contact the membrane and have the opportunity to preferentially bind to the membrane. The concentrator suitably includes silica, alumina, nitrocellulose, an oxide-coated polymer, or any combination thereof. Suitable concentrator materials are described in additional detail elsewhere herein.

The concentrator may, in some embodiments, include one or more lysing agents, which agents can include a chaotropic agent, urea, guanidine, or any combination thereof. As one non-limiting example, the concentrator might be impregnated with one or more lysing agents so as to effectively lyse cells and then preferentially bind the cells' nucleic acid contents.

One or more reagents are also placed, in some embodiments, within the chamber. Such reagents include those chemical species that effect a PCR reaction, which reagents include an enzyme, a nucleic acid, a chaotropic agent, a lysing agent, a nucleic acid primer, a label, a tag, a biological material, a buffer, a salt, a deoxyribonucleotide, or any combination thereof. Such listing of reagents is not exhaustive, and other reagents useful in a PCR reaction will be apparent to those having ordinary skill in the art and may include dyes, labels, tags, and the like.

Suitable enzymes include, for example, Taq polymerase and other polymerases, reverse transcriptase enzymes, and the like. Salts suitable for the claimed invention include KI, $MgCl_2$, and the like. Nucleotides such as dNTPs, where N stands for A, C, G, T, or U nucleotides of nucleic acids RNA and DNA, oligonucleotide primers, carrier DNA and RNA, are all considered includable reagents, as are buffer components, carbohydrate stabilizers such as trehalose, or even polymers such as polethylene glycol.

Dyes may also be used as reagents. Suitable dyes include SYBR Green and other dyes that will be known to the user having ordinary skill in the art and will be chosen according to the user's goals and needs. Passivants—such as bovine serum albumin (BSA)—may also be used as reagents, as well as PCR enhancing-species such as dimethyl sulfoxide (DMSO) and betaine. Commercial preservatives—for example, Biomatrica SAMPLEGARD™ (www.biomatrica.com, San Diego, Calif., USA)—may also be included as reagents.

Lysing agents such as lysozymes and proteinase K may be used as reagents. Other commercial lysing reagents, chaotropic salts such as guanidine HCl, guanidine thiocyanate, NaCl, NaBr, and NaI, sodium perchlorate, and detergents—including such as sodium dodecyl sulfate (SDS) and polysorbate detergents, such as TWEEN™ (www.croda.com, Edison, N.J., USA).

It will be apparent to those having ordinary skill in the art that, depending on the reagents residing within the chamber, chemical reactions other than—or in addition to—a PCR reaction may be performed within the chamber. As one non-limiting example, cells could be introduced into the chamber where they contact a reagent that labels the cell, after which the cells are transported out of the chamber by way of the outlet. Thus, the claimed chip is useful as a reactor vessel for a broad range of reactions, which reactions are limited only by the user's choice of reagents and processing conditions.

Some configurations of the chip include a heater capable of heating material residing within the chamber. Such heaters have utility in the PCR reaction in that applying heat to the reactant mixture during the course of the reaction enhances the progress of the PCR reaction. Heaters can be thermoelectric heaters, combustion heaters, and the like. Microwave radiation may also, depending on the user's constraints, be a suitable manner of heating the contents of the chamber. Heating may also be used to enhance the lysing processes that may be performed within the chamber. In some embodiments, the chip will include a conductive trace to allow for heat transport in or out of the chamber. Similarly, the chamber may include one or more heat exchangers so as to enable control over the temperatures within and outside of the chamber.

Other configurations include a source of ultraviolet radiation, infrared radiation, or both, capable of illuminating material residing within the chamber. Without being bound to any particular embodiment, such sources of illumination may be useful in heating material within the chamber, sterilizing material within the chamber, initiating a reaction within the chamber. Other uses for such illumination will be known to those having ordinary skill in the art.

Also provided are methods for analyzing a cell-containing sample, comprising performing, within a chamber disposed on a substrate, at least the steps of: introducing the cell-containing sample into the chamber by way of an inlet comprising an effective cross-sectional dimension in the range of from about 1 to about 10,000 microns; lysing one or more cells of the cell-containing sample so as to liberate a nucleic acid from the sample, preferentially binding a nucleic acid to a nucleic acid concentrator residing within the chamber; eluting the nucleic acid from the element; and amplifying the nucleic acid.

Suitable chambers are described elsewhere herein. In some embodiments, the chamber has a volume in the range of from about 0.5 to about 1000 microliters.

Suitable inlets are described elsewhere herein. Suitable outlets are also described elsewhere herein.

Introducing the sample into the chamber may be accomplished by flowing, pipetting, spraying, or any combination thereof. The movement of the fluid may be accomplished by a pump, gravity, pneumomechanical means, or by other known manners of moving fluid.

It is contemplated that lysing entails contacting the cell with a chaotropic agent, which agents include urea, guanidinium chloride, or any combination thereof. Other suitable chaotropic agents will be known to those having ordinary skill in the art. Lysing may, as described elsewhere herein, also include heating the cell.

A cell are preferentially bound to the concentrator by contacting a nucleic acid to the nucleic acid concentrator. In some embodiments, the user will adjust the process conditions—sample flow rate, porosity of concentrator—so as to optimize the binding of cells to the concentrator. In some embodiments, the user may effect mixing or reciprocal fluid flow, or circulating fluid flow, so as to provide the sample multiple opportunities to pass through or along the concentrator.

Elution is performed by heating the nucleic acid concentrator, in some embodiments. In other embodiments, the user may apply one or more elution reagents to unbind the nucleic acid from the concentrator, which reagents may include ethanol- and other alcohol-based solutions, low-pH and/or low-salt buffers, and de-ionized water.

Amplifying the nucleic acid includes effecting one or more PCR reactions. Operating conditions—temperature, reagent concentrations, and the like—will be known to those having ordinary skill in the art or will be apparent without undue investigation, and suitable reagents are disclosed elsewhere herein. A PCR reaction may include, depending on the needs of the user, two or more cycles, so as to achieve the desired product or products. Multiplexed PCR reactions may be performed, wherein the method is applied to effect PCR reactions to detect two or more target nucleic acids or sequences.

The methods also contemplate monitoring a product of the polymerase chain reaction. Such monitoring can include the real-time monitoring of the creation of a product of a PCR reaction, which real-time monitoring is described in the Examples section of this filing. A user may perform a multiplexed detection wherein the user monitors the status of two or more targets by using two or more dyes that fluoresce at different wavelengths and then illuminating the reaction products sequentially (or simultaneously, if practicable) with those different wavelengths so as to determine the presence—and quantity—of the labeled targets.

In some embodiments, the methods include preferentially binding a nucleic acid to the nucleic acid concentrator following the amplifying of a nucleic acid. Following this binding step, the chamber may be flushed or washed with a buffer to clear any impurities; this washing step is not necessarily mandatory in all cases. After binding nucleic acid to the concentrator, the user may introduce one or more additional reagents into the chamber, which reagents are typically capable of effecting, alone or in concert, a chemical reaction, or, alternatively, retarding or stopping a reaction. The additional reagents may, in some cases, be chosen to participate in an additional PCR reaction or reactions. The bound nucleic acid may be eluted again, after which the user may effect a PCR reaction involving one or more of the additional reagents.

The present invention provides a means to simplify and streamline lysis, nucleic acid isolation, and PCR processes. Further, the methods described here are readily adaptable to microfluidic or 'lab-on-a-chip' systems for nucleic acid based processing and testing. Features of the invention provide for considerable simplification in both the design and operation of such systems.

In one embodiment, the present invention combines pre-loading of the PCR reaction chamber with PCR reagents, primers and enzymes in dried form, and encapsulation of the dried PCR components with wax or other materials with similar properties. The combined PCR components are first prepared in correct proportions, as a buffered, aqueous solution. The reaction mixture can be prepared with components at higher concentrations than normally used in PCR by reducing the amount of water added to the mixture. As such, more concentrated PCR mixtures will tend to dry faster. The liquid PCR reagent mixture is then loaded into the PCR vessel or chamber and left to air dry. The drying process can be accelerated by applying mild heat (less than about 50° C.) and, or, placing the vessel or chamber under vacuum. After sufficient dehydration (e.g., 1 to 24 hours) the PCR reagents are dried in the form of film residue or crusty coating covering the inner surfaces of the chamber or vessel. Freeze drying of the PCR reagent mixture is also feasible, in which case the PCR mixture is frozen, by for example, cooling the chamber or vessel with dry ice. The water is removed from the sublimation, which can be accelerated under vacuum. The reagents can also be provided in dry form. A PCR-compatible dye can be added to the mixture to make the residue more visibly evident in the PCR chamber. The dried PCR reagents include the polymerase enzyme, one or more primer pairs, buffers, nucleotides, and other additives that enhance PCR such as bovine serum albumin (BSA) or polyethylene glycol (PEG), as well as various stabilizers and preservatives. The primers are short (20-30 base pair) oligonucleotides that bind to complementary initiate the replication of specific nucleic acid sequences by the polymerase enzyme. Multiplexing of the PCR reaction, i.e., the simultaneous amplification of distinct nucleic acid sequences, can be effected by using multiple primer pairs.

To perform the PCR step, a liquid sample portion containing the nucleic acid template is added to the reaction vessel. The programmed temperature cycling of the PCR process is then initiated, the first step of which heats the reaction mixture to over 90° C., causing the wax encapsulant to melt. Because molten wax is less dense than the aqueous reaction mixture, the immiscible molten wax portion is buoyant and segregates to the top of the reaction mixture. As a result, the dried PCR reagents are exposed to the aqueous phase, and are quickly and completely hydrated by the liquid sample. When rehydrated for PCR, the PCR components are at concentrations determined by the original formulation of the mixture dried in the chamber or vessel, and the amount of liquid (containing the nucleic acid template) added to chamber. The volume of liquid used to rehydrate the dried PCR components is limited by the size of the reaction chamber or vessel, and thus, the amount of PCR components dried in the chamber can be scaled to yield a PCR reaction mixture with the optimal concentration of components. In practice, successful PCR amplification can still be achieved even if the final concentration of PCR components varies from 50% to 200% of the nominal optimized concentrations. Thus, the process is not overly sensitive to the amount of liquid that rehydrates the dried PCR mix.

The method described herein has the added advantage of a so-called 'hot start' PCR regimen: the reagents and nucleic acid template are kept separated until the reaction mixture has reached a more optimal temperature. Thus, non-optimal or unwanted reactions that occur at low temperatures due to non-specific primer annealing and spurious amplification are avoided. A second advantage of wax encapsulation is its function as a moisture barrier. Dried PCR reagents tend to be hygroscopic, and absorption of water will decrease the shelf-life of the PCR reagents dried in the chamber. Thus, the encapsulation will facilitate long term storage of the pre-loaded, dried PCR reagents.

The claimed invention also facilitates integration of PCR with sample processing steps that are typically performed prior to PCR. There is incentive to integrate lysis and isolation with PCR. More specifically, integration of processing steps implies that these steps are performed in the same chamber or vessel, or are performed in separate chambers and vessels that are interconnected or fluidically coupled in close proximity to each other. The close coupling of lysis and isolation with PCR reduces sample loss, lessens the chance of cross-contamination of samples, and minimizes degradation of nucleic acids such as RNAs that are relatively unstable. Automation of processing is also facilitated by integration. Indeed, an outstanding advantage of microfluidic is the integration and close coupling of various process steps.

In many microfluidic systems that integrate PCR with nucleic acid isolation, the PCR chamber is sited downstream from a solid-phase extraction component. For example, in the commonly used silica-chaotrope method, the PCR chamber is fluidically connected to a compartment that contains the nucleic acid binding phase in the form of a porous silica membrane. The lysate is propelled through the silica membrane. The membrane is then washed with various solutions, and finally the nucleic acid is eluted from the membrane. The eluted fraction is then transferred to the PCR chamber or vessel, whereupon the PCR reaction components are added, the chamber or vessel is sealed, and the mixture of eluted liquid containing the nucleic acid template and the PCR reaction components is temperature cycled. Using dried PCR reaction components pre-loaded into the PCR chamber eliminates the need to add PCR components during operation of the chip. Further, the wax encapsulation of dried PCR reagents allows the flow-through from the upstream silica membrane to be directed through the PCR chamber since the wax encapsulation protects the dried PCR reagents from premature hydration.

The methods of this invention allow an optimal fraction of the total elution volume to be used for PCR. Specifically, the total volume eluted from the membrane is typically on the order of 100 microliters and therefore exceeds that needed for PCR, which is typically on the order of 10 microliters. Further, a certain fraction of the eluted volume is optimal for PCR amplification due to that fraction having a high concentration of template and low concentration of PCR inhibitors. Specifically, the first fractions initially eluted from the membrane often contain residual PCR inhibitors, especially ethanol from the wash steps. On the other hand, subsequent fractions then eluted have less nucleic acid template. Therefore, it is often observed that some intermediate fraction eluted from the membrane exhibits the highest production of PCR product.

In another embodiment of the invention, the nucleic acid isolation step is performed in the same chamber containing the wax-encapsulated PCR mix. A nucleic acid binding phase is inserted in the chamber containing the wax-encapsulated PCR mix. For instance, a disc of alumina or silica, ranging in thickness from 0.05 mm to 1 mm, and ranging in diameter from 1 mm to 10 mm, can be placed in the chamber. The lysate with binding agents (e.g., chaotrope) is introduced to the chamber and incubated with solid phase, whereupon the nucleic acids in the lysate bind to the solid phase. The bound nucleic acids can be washed with solutions as per the standard protocols used in solid-phase extraction of nucleic acids. It is noted that the introduction of lysate and wash solutions do not perturb the dried PCR reactants due to the wax encapsulant. After the final wash solution is removed, water is added to the chamber. The chamber is then thermally heated according to a standard PCR temperature cycling program. During the initial heating step, the wax encapsulant melts, and the PCR reagents dissolve into the liquid phase in which the solid phase with bound nucleic acids in immersed.

In still another embodiment, the lysis step is performed in the same chamber as PCR and isolation. A raw liquid sample with cells and/or viruses is added to a chamber which contains wax-encapsulated, dried PCR reagents, a solid-binding phase such as alumina, silica, or cellulose, and dried lysing and binding agents. The lysing agents are hydrated by addition of the liquid sample. The sample is incubated at an optimal temperature, usually in the range of about 37 to about 60° C. The incubation temperature for lysis must be below the melting temperature of the wax layer that encapsulates the PCR components. Any cells or viruses contained are lysed, yielding soluble nucleic acids in the lysate. The binding agents promote the adsorption of nucleic acids on the solid phase membrane. The nucleic acid bound to the membrane is then washed with solutions to remove impurities and lysing agents. The chamber is then filled with water and temperature cycled for PCR, the initial heating step of which melts the wax encapsulation and hydrates the PCR components.

Figure 2:
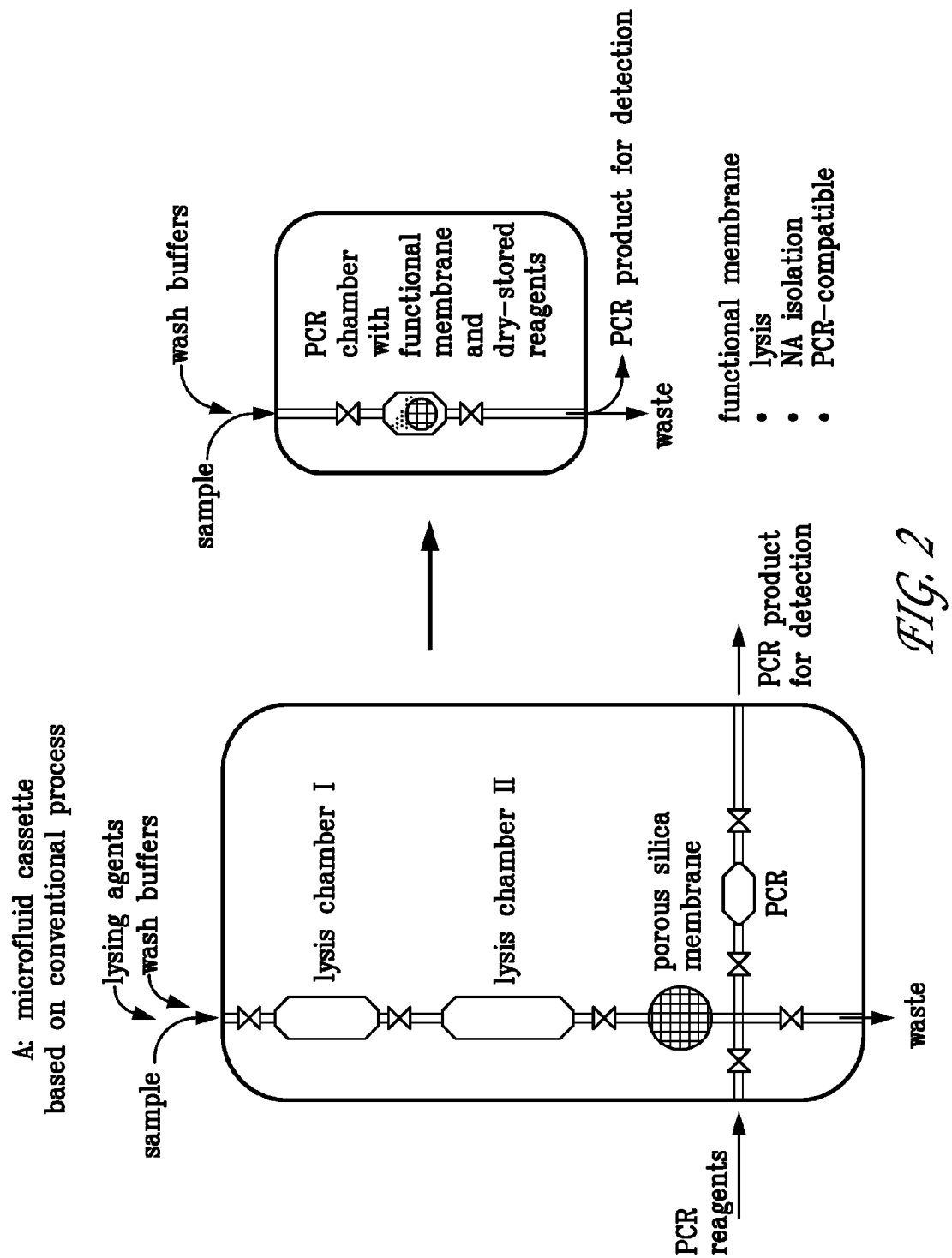
FIG. 2 depicts top plane views of conventional and simplified microfluidic lab-on-a-chip systems for PCR based assays.

FIG. 2 shows an example of the degree of both structural and operational simplification that can be gained by utilizing the methods disclosed here. Chip 2-A represents a simplified single chamber process. It will be appreciated that not only is the structure of the chip simplified (e.g., number of chamber and valves reduced), but the operation of the chip with regard to introduction of reagents and flow control is simplified. FIG. 2 shows top plane views of conventional and simplified microfluidic lab-on-a-chip systems for PCR based assays. The chip on the left (A) is typical of a system that implements conventional benchtop protocols for separate lysing steps, solid-phase extraction using a porous silica membrane embedded in the chip for nucleic acid isolation, and a separate PCR chamber connected and valved such that a fraction of the isolated nucleic acid-containing liquid eluted from the silica can be diverted into a PCR chamber, which is then sealed and thermally cycled. The chip on the right (B) shows the considerable simplification gained by a single chamber process for lysis, nucleic acid isolation, and PCR, and using pre-loaded, dry-stored reagents.

EXAMPLES AND FURTHER EMBODIMENTS

Working Example Number 1

Streamlined Chip-Based Lysis, NA Isolation, and PCR

Figure 3:
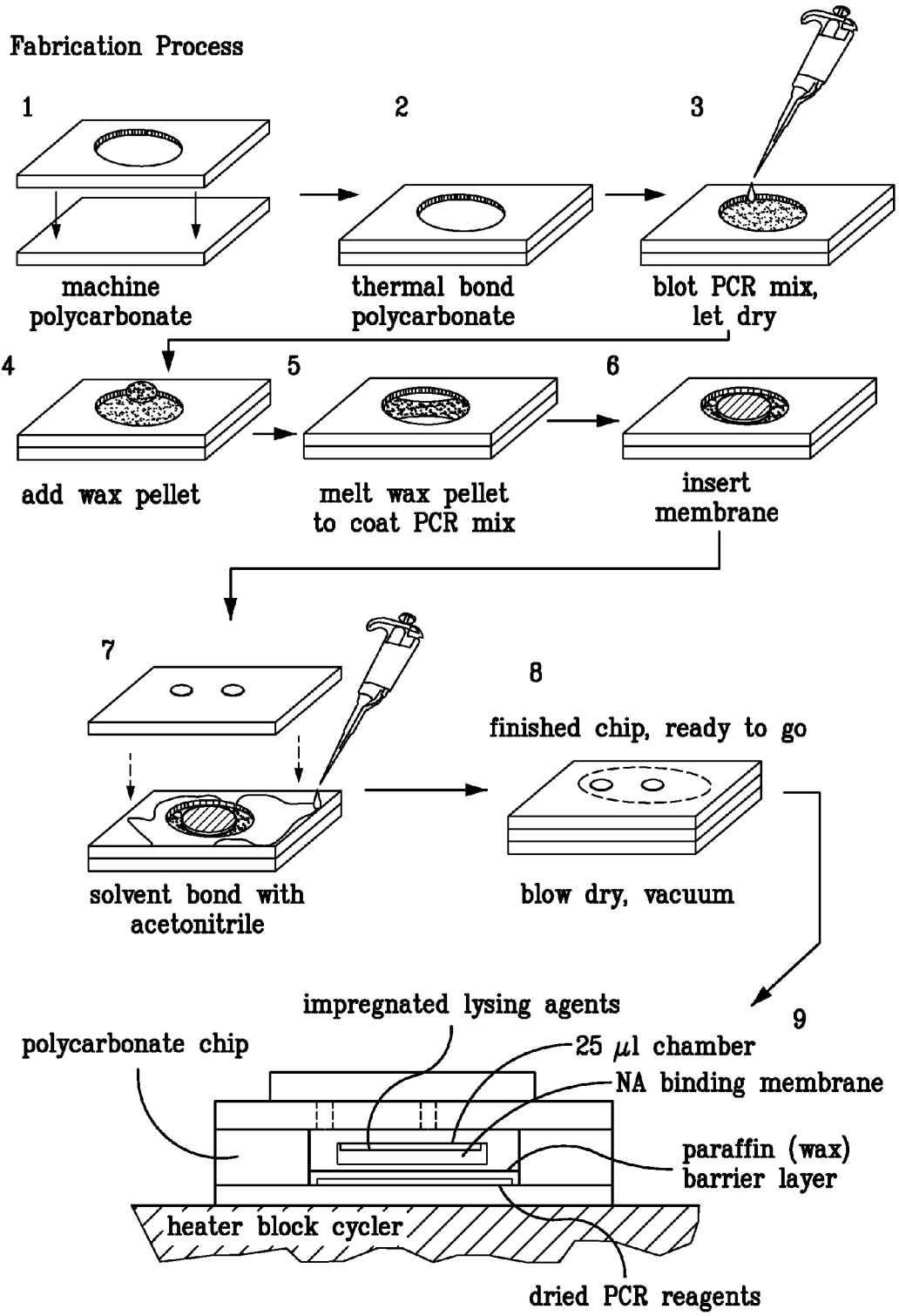
FIG. 3 depicts steps for preparing a chip for PCR.

This example describes a plastic (polycarbonate) PCR chip that utilizes a single chamber for bacterial cell lysis, nucleic acid isolation, and PCR. FIG. 3 shows the steps in preparing the chip for operation. PCR reagents (including primers and Taq polymerase) are mixed with a commercial preservative (Biomatrica™, www.biomatrica.com (San Diego, Calif., USA), pre-loaded into the chamber of the chip (unbonded with no cover), and dried as a film coating the inside the chamber. The dried PCR charge is encapsulated with a layer of paraffin wax that protects the PCR mix from dissolution during the lysis and various wash steps. A 1.2-mm or 2.0-mm diameter Whatman FTA™ (www.whatman.com, Kent, UK) membrane disc is inserted into the chamber. Next, the chip cover (with inlet and outlet ports) is solvent-bonded using acetonitrile to form an enclosed chamber.

Figure 4:
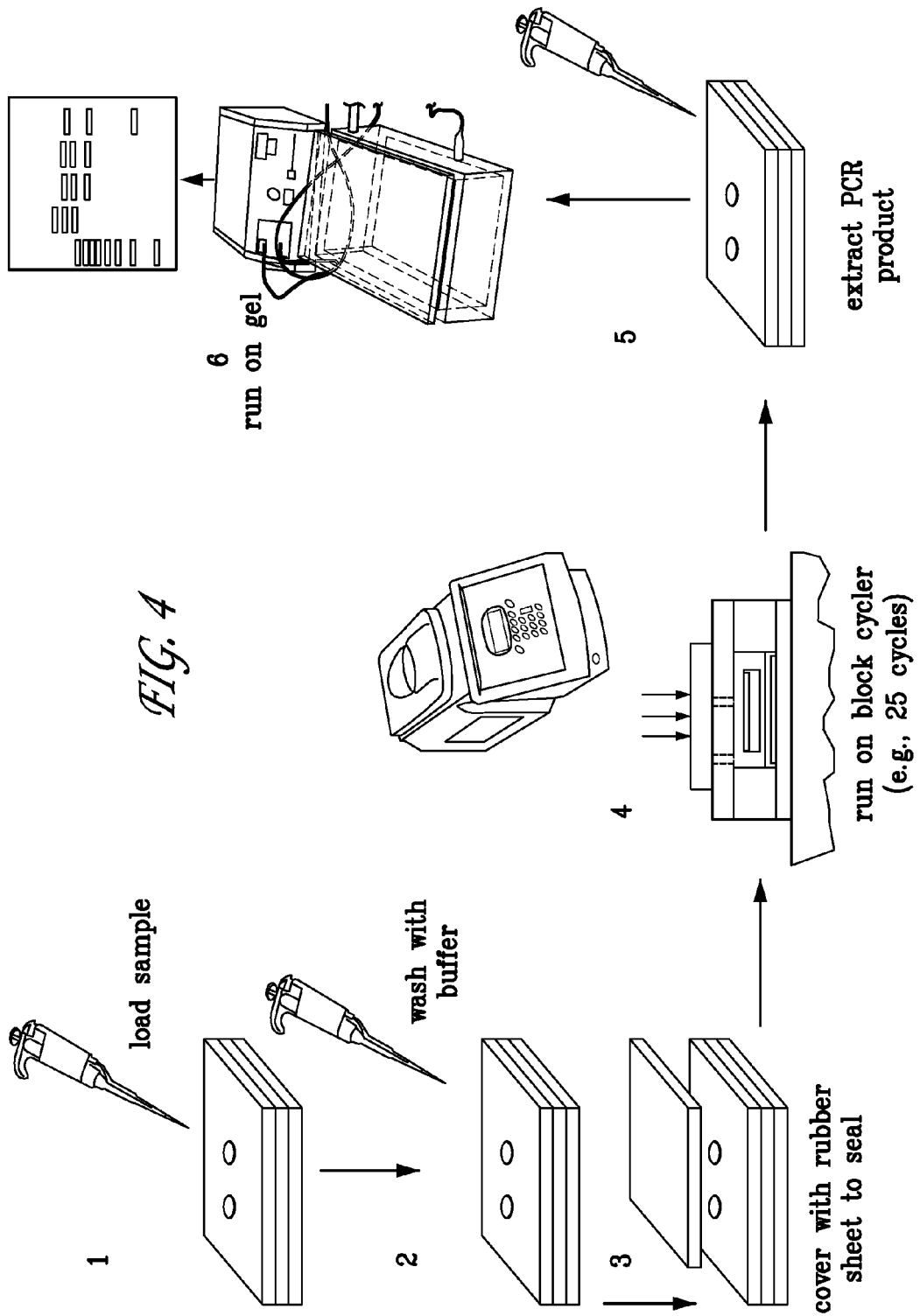
FIG. 4 illustrates operation of a chip.

The chip is ready for sample testing. The operational steps are shown in FIG. 4. The cell-containing sample is loaded into the chip, incubated with the membrane, and left to dry. The membrane chip is washed several times with buffer, and then refilled with DI water. The chip inlet and outlet ports are covered with a sheet of rubber and placed on a thermal block cycler. The lid of the cycler is tightened to clamp down on the rubber sheet, sealing the chip. During the high-temperature PCR thermal cycling, the paraffin barrier melts and the dried PCR reaction components are hydrated and mixed with the liquid contained into the PCR chamber. At the end of the PCR, the chamber contents are extracted with a pipette and run on an agarose gel.

The operational basis of the assay is as follows. Prior to PCR, the initial cell lysis step, and subsequent nucleic acid extraction and isolation, are implemented by way of the solid-phase nucleic acid binding media (Whatman FTA™ cellulose filter paper) that is included in the PCR chamber. The Whatman FTA™ paper is impregnated with lysing reagents. When cell-containing samples are loaded into the PCR chamber and contacted with the cellulose filter paper, the cells are lysed and their nucleic acids are immobilized on the filter paper. The filter paper is washed several times by flowing buffer solutions through the chamber in order to remove proteins, residual lysing agents, and other cell culture debris that might otherwise inhibit PCR. The chamber is then filled with deionized water. The chip is then thermally cycled on programmed block-heater. The initial PCR cycle heating step releases the PCR reagents, and presumably the nucleic acid immobilized on the cellulose filter paper is also desorbed, yielding a liquid-phase solution of PCR reagents and nucleic acid. (It is not clear whether nucleic acid immobilized on the solid-phase filter can serve as a template for PCR amplification.) The PCR product is then recovered from the chip and analyzed by gel electrophoresis. A more detailed description follows.

Test Samples

The devices and methods were tested with *Bacillus cereus*, a spore-forming Gram-positive soil bacterium associated with food-borne diseases. *B. cereus* (ATCC #27522) is obtained as a freeze-dried powder starter culture and is grown overnight in nutrient broth (Yeast-tryptone) at 37° C. with shaking, and then transferred to fresh media and grown until early log phase (about 5 hours) to yield vegetative cells. The bacteria were washed three times in sterile phosphate-buffered saline (PBS), and the final pellet was suspended in 10 ml of sterile PBS. The *B. cereus* aliquots are stored at −20° C. and thawed just before use. Raw, untreated cell culture is loaded into the chip. A 305-bp PCR product is amplified from total nucleic acid extracted from the cell culture lysate using *B. cereus*-specific primers (see below). The cell culture density is roughly estimated at approximately $10^6$ cells/ml. Also, there may be significant amounts of extracellular soluble *B. cereus* DNA in the culture media as well.

Chip Materials and Fabrication

Figure 5:
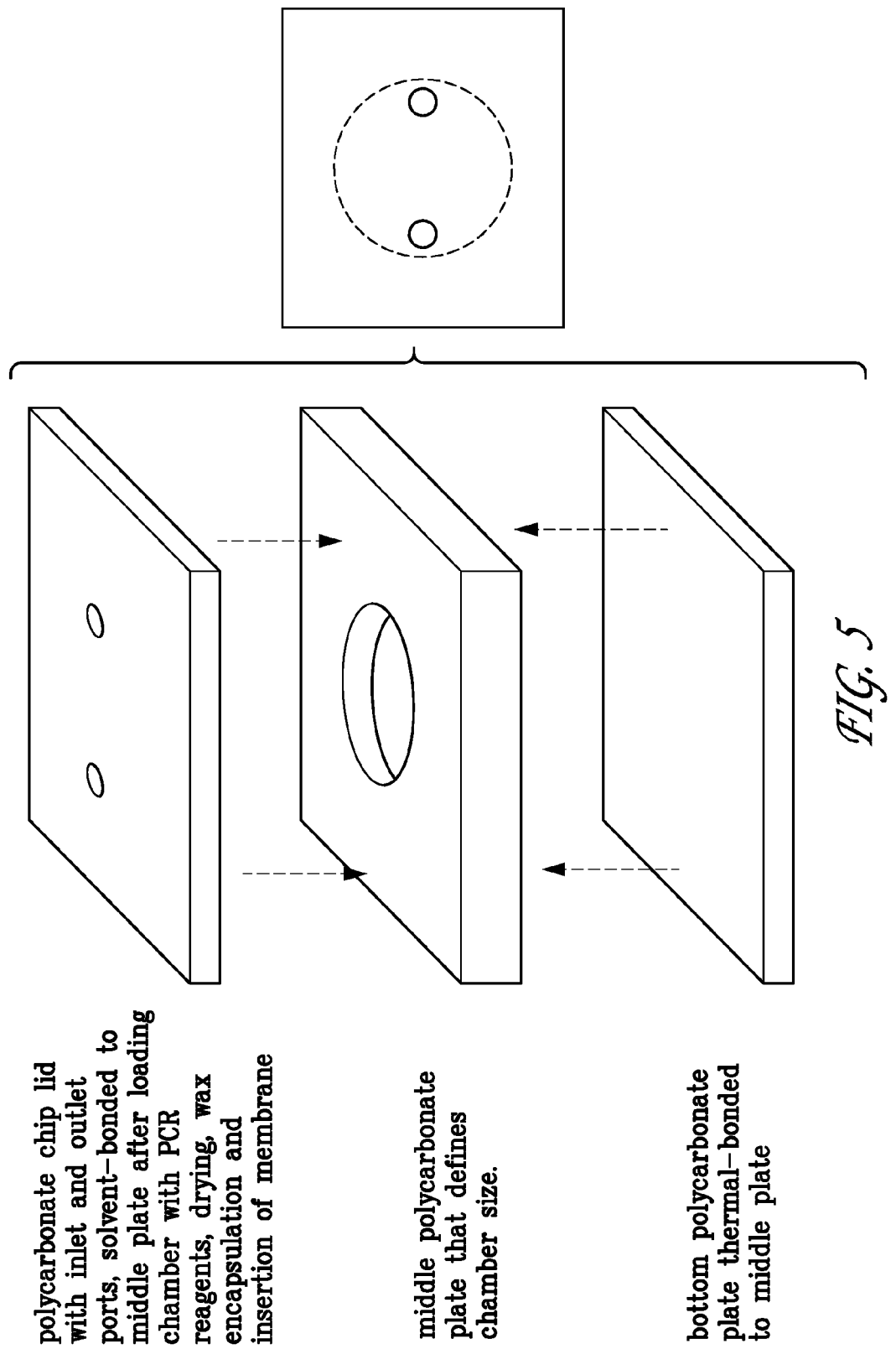
FIG. 5 depicts component chip layers.

A microfluidic chip for PCR is made as a bonded laminate structure comprising a stack of three aligned 1-cm×1-cm plates cut from polycarbonate sheeting (Ensinger, Ltd., Pontyclun, UK through McMaster-Carr), as shown in FIG. 5. The center plate is drilled with a through hole to form a cylindrical chamber with a diameter ranging from 5 mm, 6 mm, or 7.5-mm, and the thickness of the center plate (which determines the chamber depth) ranges from 0.5 mm, 0.75 mm, 1 mm, and 1.7 mm. These combinations of diameter and thicknesses result in PCR chamber volumes shown in the table.

TABLE 1

PCR Chamber Volumes [(1] for Various Chamber Dimensions

| | chamber diameter (mm) | | | | |
|---|---|---|---|---|---|
| depth (mm) | 5 | 6 | 7.5 | 8.5 | 10 |
| 0.25 | 4.9 | 7.1 | 11.0 | 14.2 | 19.6 |
| 0.5 | 9.8 | 14.1 | 22.0 | 28.3 | 39.3 |
| 0.75 | 14.7 | 21.2 | 33.1 | 42.5 | 58.9 |
| 1.0 | 19.6 | 28.2 | 44.2 | 56.7 | 78.5 |
| 1.5 | 29.4 | 42.3 | 66.2 | 85.1 | 117.8 |

$V = t \cdot \pi \cdot D^2/4 = 0.785 \cdot t \cdot D^2$

The bottom plate is typically of thickness 0.250 mm, but 0.125 mm thickness has also been used to improve heat transfer. The top plate that forms the capping lid of the PCR chamber is drilled with two holes, arranged to form inlet and outlet ports. The diameters of the holes are 0.813 mm (drill #67, 0.032 inches) or 0.838 mm (drill #66, 0.033 inches). The holes should be sited along a diameter of the underlying cylindrical chamber and placed close to the perimeter of the chamber to facilitate bubble-free filling of the chamber. After machining, the polycarbonate plates are cleaned in an ultrasonic bath with isopropanol for 10-15 minutes.

The bottom plate is thermally-bonded to the center plate in a Carver hydraulic press at a temperature of 143° C. for 30 minutes, and a pressure of approx. 300 psi.

Solvent Bonding

The top cover of the chip is solvent-bonded after loading the chamber with PCR cocktail, drying of the PCR charge, adding wax encapsulant, and inserting the nucleic acid binding membrane(s) (see below). For solvent bonding, the contacting surfaces of the top plate and middle plate are cleaned with isopropanol using a Q-tip cotton swab, and blown dry with compressed air. The top plate is solvent-bonded to the middle sheet using 10 microliters of acetonitrile (Fisher Scientific, HPLC Grade) applied to the top surface of the middle plate with a pipette, whereby a bead ring of acetonitrile is deposited around the periphery of the chamber. The plates are aligned, mated, and lightly compressed by applying pressure by hand with forceps. The sheets should be positioned and compressed within about 20 seconds of applying the acetonitrile to gain maximum bond strength. For perhaps a few seconds after contact, the bonding plates can be slid to improve desired alignment, but this is not optimal and ideally the chip plates should be mated into their final bonded position with minimal manipulation. The bonding operation is performed in a fume hood due to the volatility and toxicity of acetonitrile. Care should be taken to avoid getting any acetonitrile solvent in the chamber, as this may adversely affect the PCR. Although (as discussed below), PCR is comparatively tolerant of acetonitrile, inhibition effects may still be operative if acetonitrile is adsorbed in the chamber, the wax encapsulant, the dried PCR mix, or the porous membrane.

Effect of Acetonitrile on PCR

The room-temperature solvent bonding technique may result in residual acetonitrile left in the PCR chamber or adsorbed to the membrane or paraffin.

Figure 6:
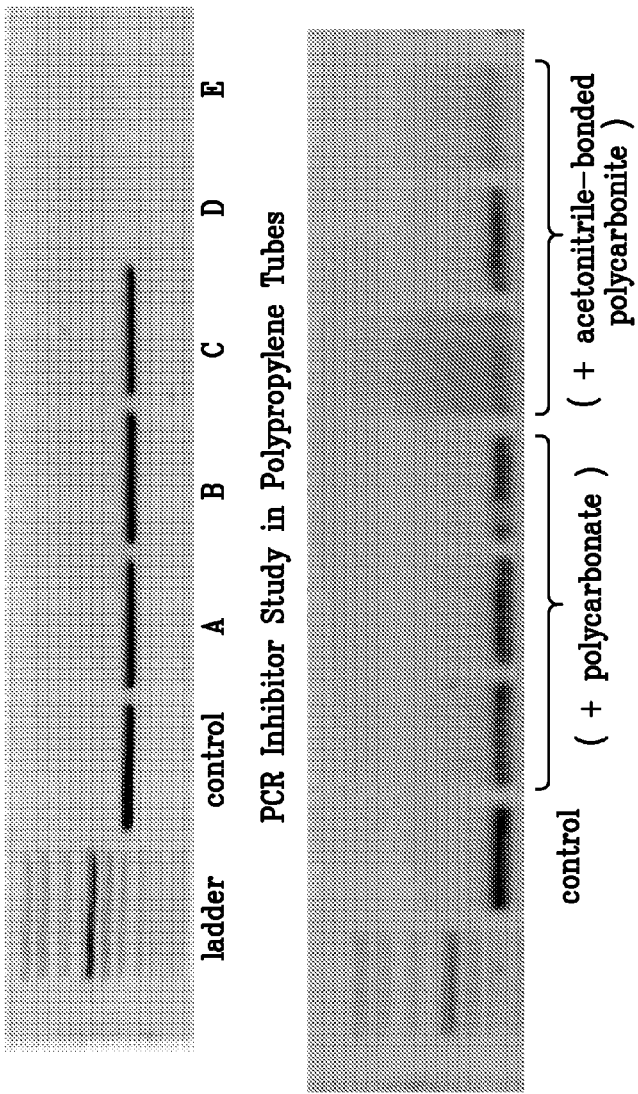
FIG. 6 illustrates PCR reactions in tubes.

Therefore the effect of acetonitrile on PCR was investigated. PCR reactions (15 ul total volume) with approx 100 ng template DNA) in 0.2 ml PCR tubes were spiked with varying amounts (0 to 4.0 ul) of acetonitrile. The PCR products were analyzed by gel electrophoresis (1.5%, with EtBr stain). FIG. 6a shows the results indicating that the PCR reaction (15 ul total volume) can tolerate up to 1 ul of acetonitrile, but higher concentrations completely inhibit PCR. In a second investigation, pieces of polycarbonate and acetonitrile-bonded polycarbonate pieces were added to PCR reaction tubes. The results are shown in FIG. 6b. It appears that exposure of the PCR reaction to solvent-bonded pieces of polycarbonate may inhibit PCR, at least in some cases. Polycarbonate surfaces may be roughened may be roughened by contact with acetonitrile, which may increase adsorption of PCR components (e.g., Taq polymerase and primers), diminishing the PCR amplification. Care must be taken to avoid excessive residual acetonitrile in the PCR chamber, and that exposure of the PCR reaction to solvent-bonded surfaces of the polycarbonate chip should be minimized. Nevertheless, compared to many other adhesives and tapes investigated by us, which generally caused strong PCR inhibition, the acetonitrile bonding method could be used to reliably form polycarbonate PCR chambers that did not exhibit PCR inhibition.

Pre-Loading and Dry Storage of PCR Reagents

Prior to solvent-bonding of the chip, the chip chamber is loaded with PCR reagents, and dried. Preparation of PCR ingredients is as follows.

PCR Enzymes and Reagents

Taq DNA polymerase (5 U/ul) [Eppendorf MasterTaq™ kit via 5Prime/Fisher]

Taq buffer with self-adjusting Mg2+ (10×): 500 mM KCl, 100 mM Tris-HCl, pH 8.3; 15 mM Mg(OAc)2 [Eppendorf MasterTaq™ kit via 5Prime/Fisher]

dNTP mix (10 mM) [Invitrogen or Eppendorf]

Molecular Biology-Grade $H_2O$ [Eppendorf]

BSA, Bovine Serum Albumin, 0.2% (2 ug BSA/ul H2O) [Invitrogen, Catalog #1367901]

Primers

Primers (Table 2) were custom ordered from Operon Biotechnologies, Inc. (Huntsville, Ala.), Order #6670464 (23 Jul. 2007).

TABLE 2

Primer Sequences

| | Seq | seq5( to 3( | Length | MW | Tm (° C.) | Purif. |
|---|---|---|---|---|---|---|
| Forward | 5001 Bc2F | [AminoC6 + DIG]AAGGYYCAAAAGATG GTATTCAGG (SEQ ID NO: 1) | 24 | 8187.72 | 59.44 | HPLC |
| Reverse | 5002 Bc2R | [BioTEG]TCTCGCTTCACTATTCCCAAGT (SEQ ID NO: 2) | 22 | 7165.99 | 60.81 | HPLC |

Primers are diluted to working stock solutions of 10 mM concentration and frozen at −20° C. Current working stock solution is kept refrigerated to avoid excessive freeze-thaws.

The formulation of the PCR mix dry-stored in the chamber is shown in Table 3. The total volume of 1×PCR mix should be scaled to the volume of the chamber. In this case, the liquid sample will hydrate the mix to the final volume of the chamber. In order to speed up drying, the water content in the PCR mix can be reduced by a factor of about two, thus reducing the amount of water that must evaporate from the sample during the drying step. The water content should not be drastically reduced, less the PCR components may not dissolve.

TABLE 3

PCR Mix Components

| Component | (2X) | (1X) | final conc. |
|---|---|---|---|
| H2O | 29.6 | 29.6 | |
| Taq buffer with Mg2+ (10X) | 10.0 | 10.0 | 1X (1.5 mM Mg2+) |
| dNTP (10 mM) | 2.0 | 2.0 | 0.2 mM |
| BSA (0.2%) | 3.0 | 2.0 | 0.006% |
| DIG-F primer (10 mM) | 1.8 | 1.8 | 0.18 mM |
| BIO-R primer (10 mM) | 1.8 | 1.8 | 0.18 mM |
| Taq (5 U/(l) | 1.8 | 1.8 | 9 U/100 (l |
| sample/template | — | 50 | |
| total volume | 50.0 (l | 100 (l | |

Pre-Loading/Dry Storage of PCR Mix

Figure 7:
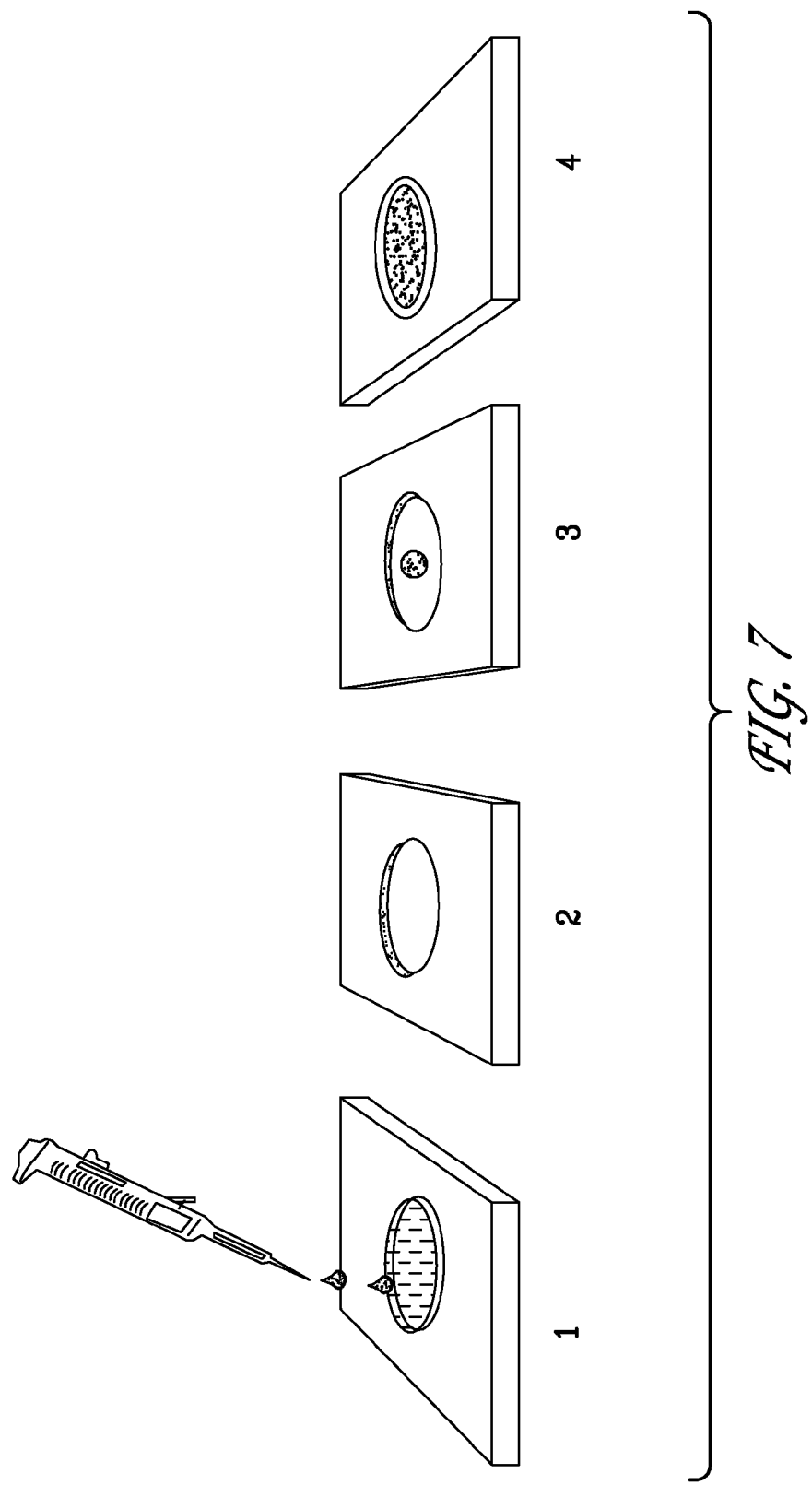
FIG. 7 depicts loading, drying, and wax encapsulation of PCR reagents in chip.

Biomatrica SampleGard™ (San Diego, Calif.) preservative is mixed with the liquid PCR mix. Specifically, 15 to 25 ul of a 2×PCR mix is injected with a pipette into a Biomatrica™ tube or well (in a 96-well plate) containing a charge of Biomatrica preservative. The solid residue Biomatrica preservative is resuspended in the PCR mix and homogenized by up and down pipetting. The mix now has a pink tint due to a coloring agent in the Biomatrica™. This proves useful for discerning the presence and location of PCR mix in the chip. As shown in FIG. 7, the PCR mix and Biomatrica preservative mixture is then blotted into the cylindrical chamber of the chip using a pipette, in aliquots of 2-3 ul at a time. The mix tends to run to the outer edge of the chamber and dries as a ring around the perimeter of the chamber. The PCR and preservative mix is left to dry in air (for at least 24 hours), forming a ring of pink-colored solid residue around the perimeter of the chip.

Paraffin-Coating of PCR Reagents

The dried PCR mix in the PCR chamber is coated with a layer of wax. Roche provides a PCR-tested paraffin material Ampliwax™ PCR Gem 50 (Roche/Applied Biosystems, Foster City, Calif., N808-0150) in bead form with a melting point of approximately 55-58° C. A bead of the wax (roughly 20 mg) is cut into thirds, and one ⅓-portion of a bead is placed in the chamber of the chip. The chip is then placed on the thermal cycler block (set to 58-60° C.) for several minutes. The wax melts and forms a ring around the perimeter of the chip, covering the dried PCR mix (see FIG. 7).

Nucleic Acid Binding Phases (Membranes)

Figure 8B:
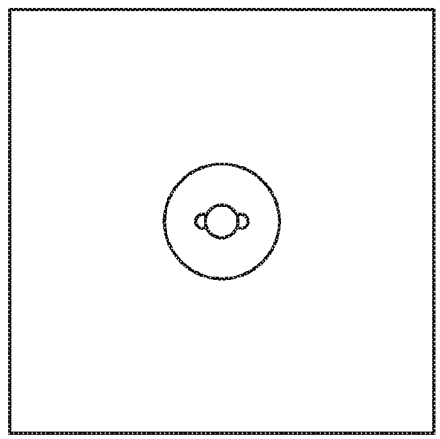
FIG. 8b depicts a chip with solvent-bonded cap with wax-encapsulated, dry-stored PCR reagents and a membrane disc.
Figure 8A:
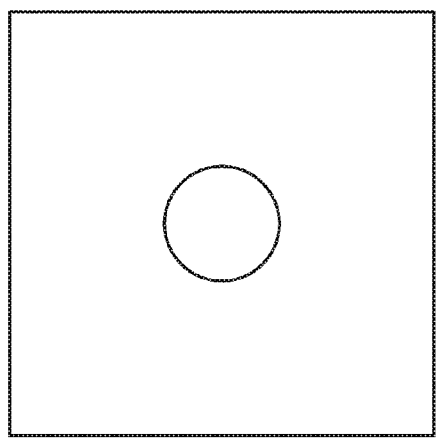
FIG. 8a illustrates a chip before pre-loading of reagents.

A Whatman FTA™ filter paper type membrane is used as the nucleic acid binding phase. The FTA™ membrane is cut in disc form (1.2-mm diameter or 2-mm diameter) with a Harris punch tool from a Whatman FTA Micro Card (Cat. No. WB12 0210). The thickness of the Whatman FTA paper is approximately 0.6 mm. The filter paper disc is placed in the chamber after wax encapsulation and before solvent-bonding the chip cover. In some instances, more than one disc was used in the chamber. A chip with solvent-bonded cap and containing wax-encapsulated pre-loaded, dry-stored PCR reagents and a 1.2-mm Whatman FTA membrane is shown in FIG. 8.

Alternative PCR Components

Figure 9:
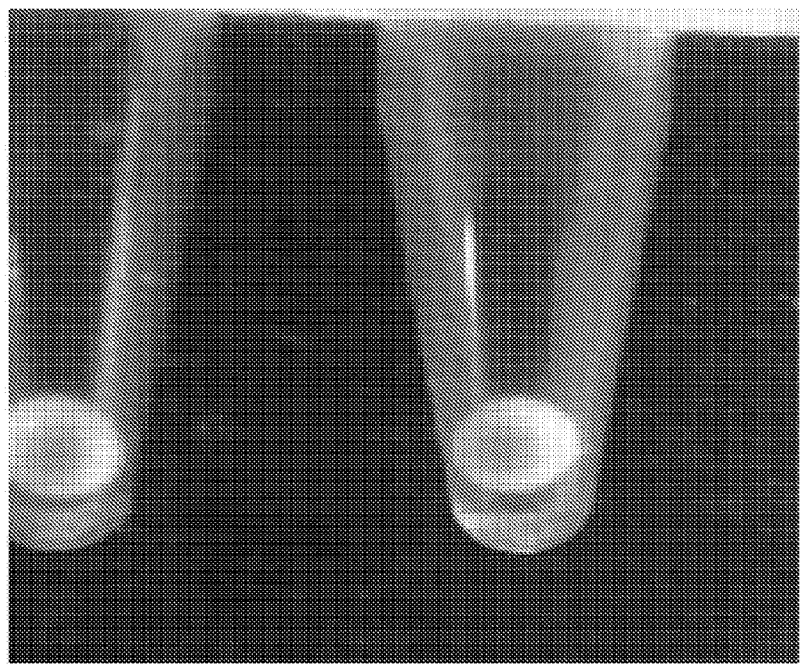
FIG. 9 illustrates commercial PCR beads.

An alternative approach uses GE Illusta™ Ready-To-Go PCR beads (GE Healthcare, Amersham Place, Buckinghamshire, UK, Cat. No. 408513-SR). As-received beads are shown in FIG. 9. Each bead is approx. 2 mm in diameter contains carbohydrate stabilizers, BSA, dNTP, about 2.5 U puReTaq DNA polymerase, and when reconstituted for 25 ul final volume, yields concentrations of 200 uM dNTPs, 10 mM Tris-HCl (pH 9.0), 50 mM KCl, and 1.5 mM MgCl2. The beads were resuspended in 10 to 20 ul H20 with 0.42 ul each of 10 mM BIO-F and DIG-R primers, and well mixed. The PCR mix was then blotted in the chip as described above. In some instances, Biomatrica™ preservative was mixed with the GE bead suspension, as described above. The stabilizers contained in the Ready-To-Go beads was found to be adequate for the purposes of dry-storing in the chip resuspended beads plus primers. It is perhaps beneficial to supplement the PCR mix made from Ready-To-Go beads with Biomatrica preservative. Further, the Biomatrica preservative includes a pinkish coloring agent that indicates the location of dried mix in the chip, even after was encapsulation. Also, after the PCR step, the recovered PCR product has a characteristic translucent pink color that indicates the dry-stored reagents were not prematurely hydrated and removed from the chamber during the sample loading and wash steps, and that the PCR reagents were properly hydrated at approximately needed proportions during the PCR thermal cycling.

PCR

PCR is performed in a Techne (Cambridge, UK and Burlington, N.J.) TC-412 thermal cycler with a flat plate ("in situ") block heater (Techne FTC41BID). The cooling and heating rate of the flat plate block heater is about 2.6° C./sec.

PCR Program

| initial denaturization | 94.5° C. | 3 mins |
|---|---|---|
| 25 cycles: | | |
| denatur. | 94.5° C. | 30 sec |
| annealing | 54.0° C. | 30 sec |
| extension | 68.0° C. | 40 sec |
| final extension | 68.0° C. | 3 mins |

Test for PCR Product

The PCR product (10 to 25 ul) is extracted from the chip with a pipette and mixed with loading dye (Promega Blue/Orange 6× Loading Dye, Cat. G1881), and run on an EtBr-stained 1.5% agarose gel [0.7 g agarose/50 ml TAE buffer/1.8 ul EtBr (10 mg/ml) buffer for eight-lane gel or 1.2 g agarose/80 ml TAE buffer/for 20-lane gel], at 115 V, 65 mA for 25 minutes, and viewed on a KODAK Image Station 440CF (Filter 4), using exposure times of 10-12 seconds. A DNA molecular weight ladder, Marker VIII (0.019-1.11 kbp) is also run on the gel [gel loaded with 6 ul of a stock solution made from 40 ul Marker VIII (Roche Cat No. 1336 045), 33 ul of 6× loading dye, 127 ul H2O].

Protocols

The chip is loaded with 10-30 ul of cell culture. Denville Sharp™ (www.denvillescientific.com, Methuchen, N.J., USA) pipette tips (10 and 20 ul) work well for loading the chips. The cell culture is incubated for ten minutes, and then decanted from the chip. The chip chamber is then left to air dry. Drying is accelerated by blowing dry air through the chamber, using a canned, compressed air and attaching a 10-ul Sharp™ pipette with the filter plug removed. Also, a mild vacuuming of the chamber can be done using a water aspirator (Venturi effect) attached to a laboratory faucet. The filter can be dried in a few minutes using aspiration.

The volume and number of wash steps is an important variable. The membrane is washed one or more times with FTA buffer, using 10 or 20 ul pipettes. Typically a wash is 10-30 μl. The wash can be continually purged through the chamber, or the membrane can be soaked for 1-5 minutes with a wash before the chamber is decanted. A similar wash step is performed with TE buffer. The TE wash can also be repeated several times. After washing, the chip is placed on the thermal block and heated at 40-45° C. for 10 minutes. This step can often be eliminated, but is included to replicate the Whatman FTA™ protocol. Next, the chip is filled with molecular biology grade water (Eppendorf) using a pipette, being careful not to create any air bubbles. The water can be forced through, or a bead of water can be placed over the inlet port, and suction can be applied to the outlet port with a pipette in order to draw the water into the chamber. The latter method seems less likely to create air bubbles.

Figure 11B:
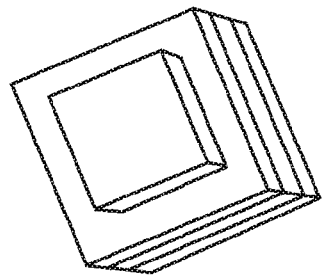
FIG. 11b depicts a rubber pad used to seal the inlet and outlet ports of the chip.
Figure 11A:
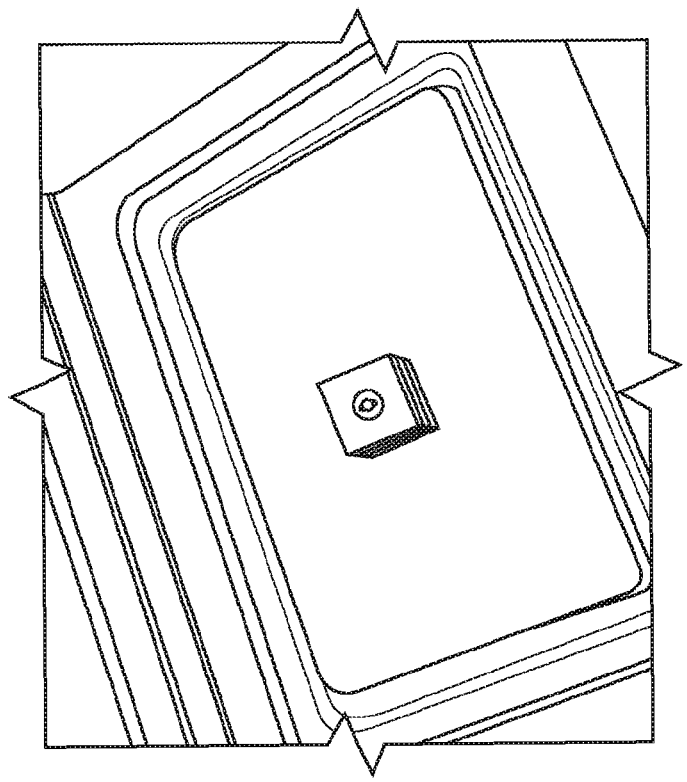
FIG. 11a depicts a PCR chip loaded with sample placed on the thermal block of the temperature cycler.
Figure 12:
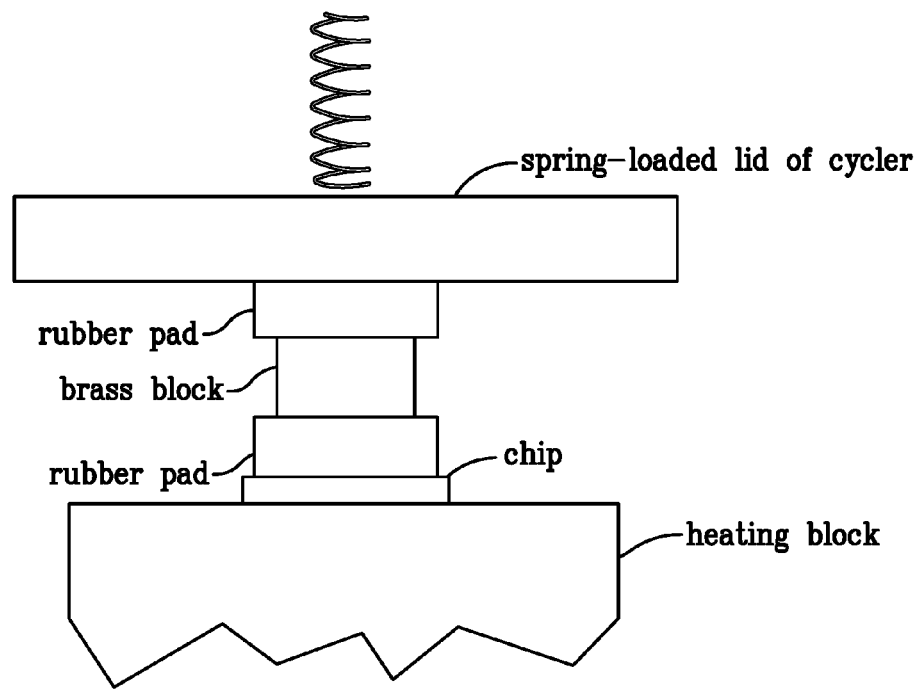
FIG. 12 illustrates a sealing arrangement for chip on thermal cycler block, a spring loaded lid is screwed down on to rubber pads that seal chip.

The chip is then placed on the Techne TC-412 flatplate block cycler as shown in FIG. 10. The chip is sealed by placing a 6-mm×6-mm, 3-mm thick rubber pad over the chip, covering both inlet and outlet port, as shown in FIG. 11b. A 6×6 mm, 5-mm thick brass block is then placed on the rubber pad, followed by another 6-mm×6-mm, 3-mm thick rubber pad (see FIG. 12).

Results

Figure 13:
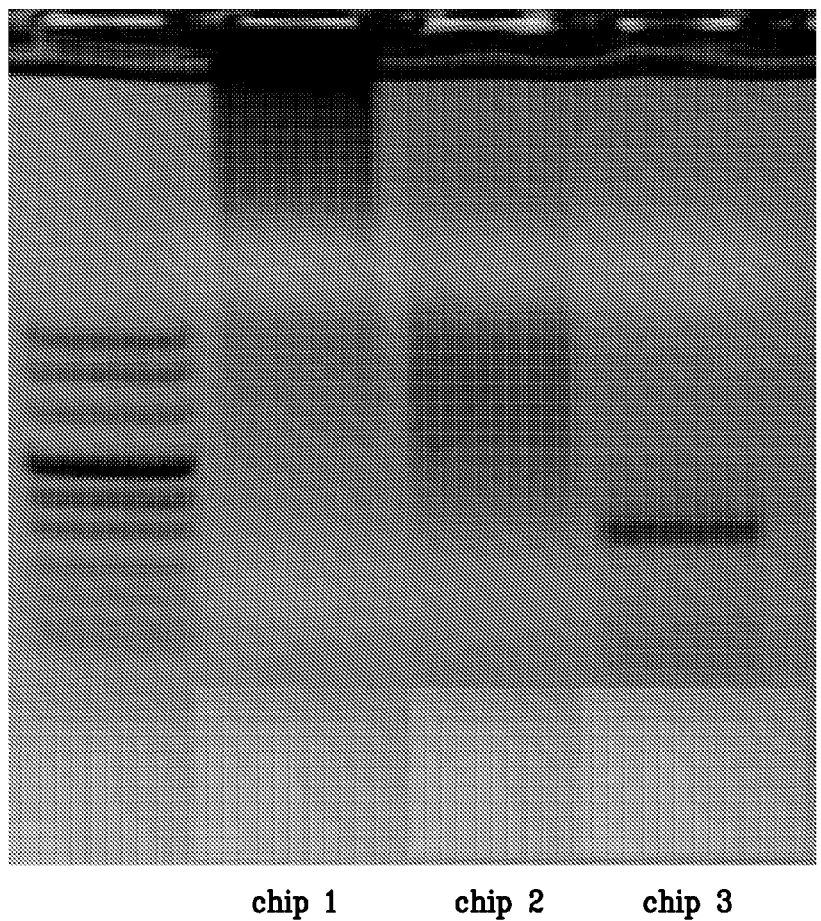
FIG. 13 illustrates a gel image for single-chamber (25 ul) chips with FTA™ membranes, pre-loaded with wax-encapsulated, dry-stored PCR reagents.

Chips were tested with varying amounts of cell culture and wash volumes, as indicated in Table 4. For the three chip experiments summarized in the Table, the PCR products were analyzed on a gel which is shown in FIG. 13. On optimizing the wash regimens, a detectable PCR product for a chip that performs lysis, nucleic acid isolation, and PCR amplification in a single-chamber with pre-loaded reagents can be attained. There is an optimum number of washes because too few washes leaves impurities and lysing agents on the cellulose membrane that inhibit PCR, and too many washes desorb the target nucleic acid that serves as a template for PCR.

TABLE 4

Chip Experiments- Sample Loading and Washes

| chip | 1 | 2 | 3 |
|---|---|---|---|
| sample (*B cereus* culture) | 1 × 15 μl | 2 × 15 μl | 2 × 15 μl |
| wash #1 FTA buffer | 1 × 30 μl | 1 × 30 μl | 2 × 30 μl |
| wash # 2 TE buffer | 1 × 30 μl | 1 × 30 μl | 2 × 30 μl |

Figure 14:
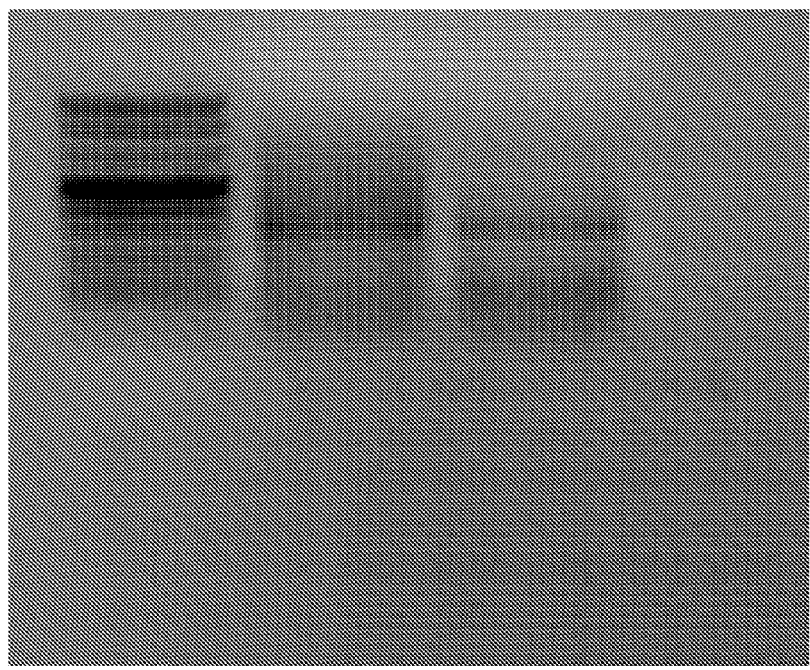
FIG. 14 illustrates single-chamber lysis, nucleic acid isolation, and PCR.
Figures 15A, 15B:
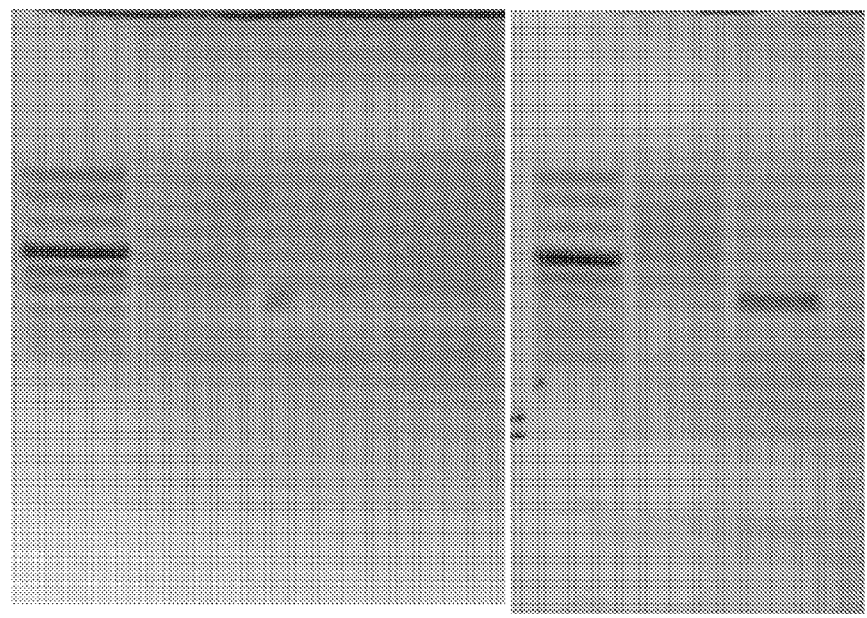
FIGS. 15a and 15b illustrate single-chamber lysis, nucleic acid isolation, and PCR (25 cycles)

Some improvement in PCR can be gained by aspirating the membrane after sample loading and the wash steps. We believe this removes residual ethanol and possibly other compounds that inhibit or interfere with PCR. For the gel shown in FIG. 14, both chips were loaded with 25 ul of *B. cereus* culture, and dried for 30 mins during which time intermittent mild suction was applied to the outlet port to facilitate drying of the membrane. Chip 1 was washed with 30 ul of FTA buffer, followed by washing with 30 of TE buffer. Chip 2 was washed two times with 30 ul of FTA buffer, followed by two washes with 30 ul of buffer. There appears to be markedly less smearing of the bands implying a 'cleaner' PCR amplification. FIG. 15 shows additional examples of the effects of varying the wash regimen on PCR product.

Working Example 2

Use of an Whatman Alumina Anodisc Membrane as Nucleic Acid Binding Phase in Single-Chamber Lysis, Nucleic Acid Isolation The prior art suggests that porous aluminum oxide ("alumina") membranes are good candidates for nucleic acid binding media in solid-phase extraction. Whatman, Inc. (has commercialized a porous alumina oxide with 0.2 micron pores and 0.02 micron pores.

Fabrication

The chip fabrication is as described in Working Example 1 with exceptions noted as follows. An aluminum oxide disc is used in place of the Whatman FTA☐ disc as the nucleic acid binding membrane. The thin (60 micron) alumina discs are more fragile than the Whatman FTA™ membranes. Whatman Anodisc™ membrane filters (Whatman Cat. No. 6809-6002, 0.2 micron pore size, 25 mm in diameter with a polyethylene supporting ring) can be cut into smaller discs (1 to 6 mm in diameter) using a $CO_2$ laser (Model X-660 Universal Laser Systems, Scottsdale, Ariz.). For laser cutting, the Anodisc™ membrane is supported on a silicon wafer with a 12 mm separation between the laser and alumina and settings: Power 4-5%, Speed 2-3%, and pulses per inch 1000. The alumina disc is placed in the PCR chamber already preloaded with wax encapsulated PCR reagents, and then the polycarbonate cover is attached using acetonitrile solvent bonding.

Operation

The cell-containing sample can be mixed outside the chamber with a chaoptropic salt (such as 6M guanidinium chloride or QIAGEN AL solution) which serves as both a lysis and binding agent. For instance, a 15 ul sample can be mixed with 15 ul of QIAGEN AL™ (www.qiagen.com, Valencia, Calif., USA) solution and incubated at 60° C. for 30 minutes. For some types of samples, the lysis efficiency can be increased by adding approx. 1 ul of proteinase K to the sample. The resulting lysate is then pipetted into the chamber of the chip. The nucleic acids in the lysate bind to the alumina membrane. The nucleic acids bound to the alumina membrane are washed with an aqueous solution of 100-200 mM NaCl aqueous solution to remove proteins and other impurities. A second wash or washes with de-ionized water follows. More particularly, after sample loading, the membrane can be washed 1-5 times with 30 ul of 200 mM NaCl solution, followed by washing 1-5 times with 30 ul of de-ionized water.

The chamber is then back filled with de-ionized water, and the PCR thermal cycling commences. After 25 cycles, the liquid contents of the chamber is recovered and run on a gel.

Working Example 3

Chip with Membrane Mounted for in-Line Flow-Through

Figure 16:
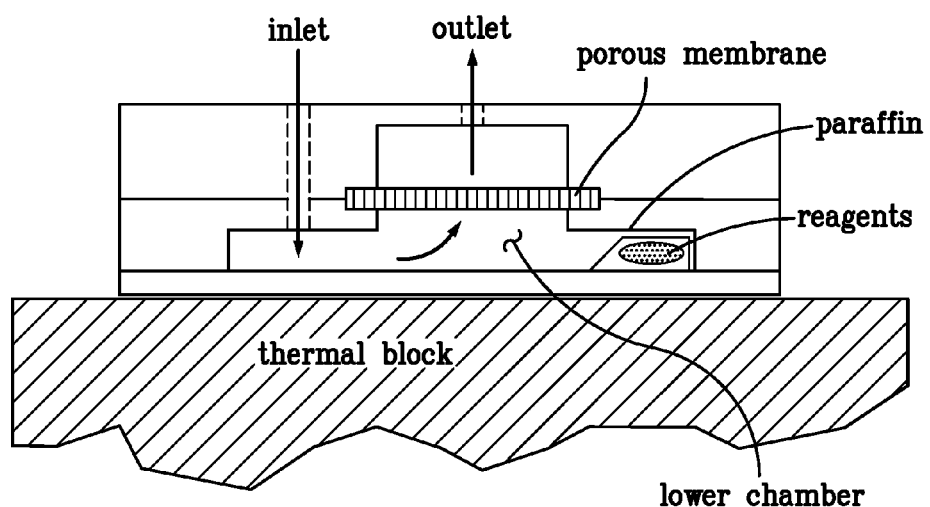
FIG. 16 depicts a schematic of membrane flow-through chip configuration.

In the previous designs shown in Working Examples 1 and 2, the free-standing membranes are inserted into the chamber. The membrane is immersed in liquid during sample loading, washes, and PCR. This arrangement is probably not optimal with respect to capturing and lysing cells and viruses, nucleic binding nucleic efficiency, and maximizing the effectiveness of wash steps. In another embodiment of the invention, as shown in FIG. 16, the chamber is partitioned with a horizontally mounted membrane. In this design, all of the sample and wash solutions are forced to flow though the porous membrane. This design should increase the binding efficiency of the membrane and the efficacy of washing steps.

Figure 17A:
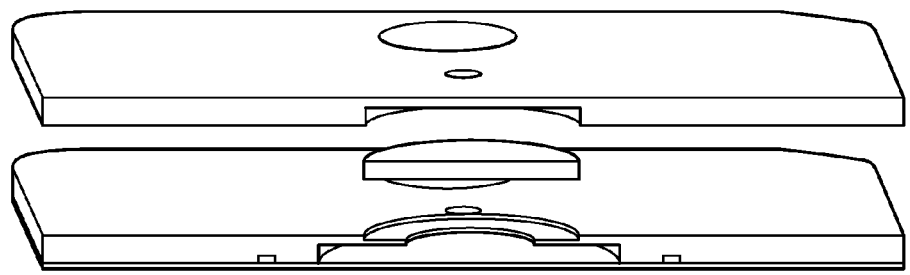
FIG. 17 depicts perspective views of machined membrane flow-through single-chamber chips for lysis, nucleic acid isolation, and PCR.
Figure 17B:
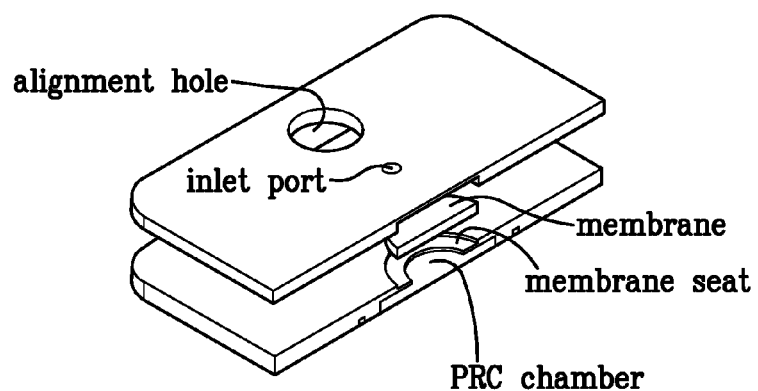

This design has been implemented by CNC (computer numerical control) machining as shown in FIGS. 17a and 17b. The top and middle part of the chip are machined from polycarbonate plates. The alumina membrane is inserted in a recess and the plates are thermally bonded in a hydraulic press at 140° C. with a pressure of 300 psi for 20 minutes. The reagents are dry-stored and wax encapsulated in the lower chamber and a 0.250-mm thick polycarbonate sheet is solvent-bonded with acetonitrile to seal the chamber. This design can employ any type of porous membrane, such as Whatman Anodisc™ porous alumina substrates and Whatman FTA™ filter paper, as well as other types of membranes including porous silica and glass fiber membranes.

Thermoelectric Heating/Cooling of Chip

Figure 18:
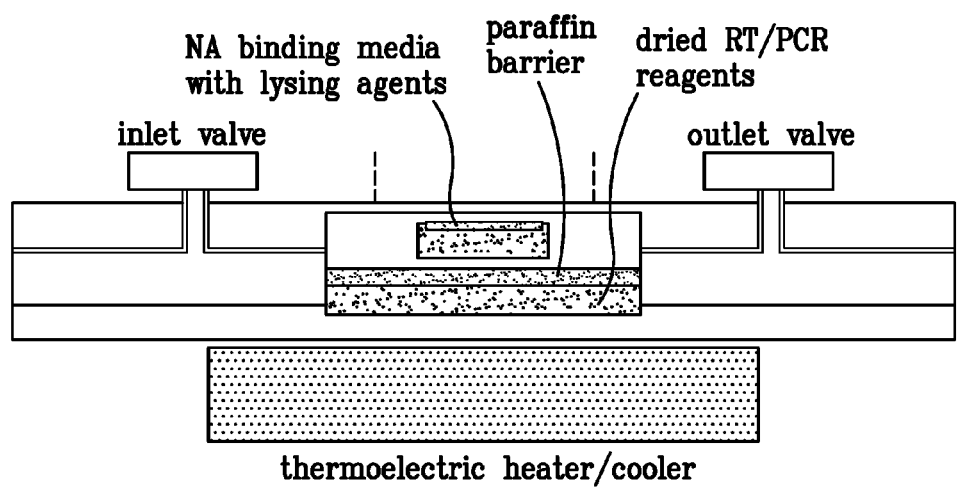
FIG. 18 depicts a single-chamber lysis, nucleic acid isolation, and PCR chip with thermoelectric heater/cooler elements.

The chamber temperature of the chip can be controlled by mounting the chip on a thermoelectric Peltier element which provides electrically-controlled heating and cooling of the chamber and its contents (FIG. 18). A thermocouple is placed near the chamber for control and monitoring of the chamber temperature. A compact, portable device can be made using simple thermoelectric elements.

Additional Alternative Designs

Figure 19A:
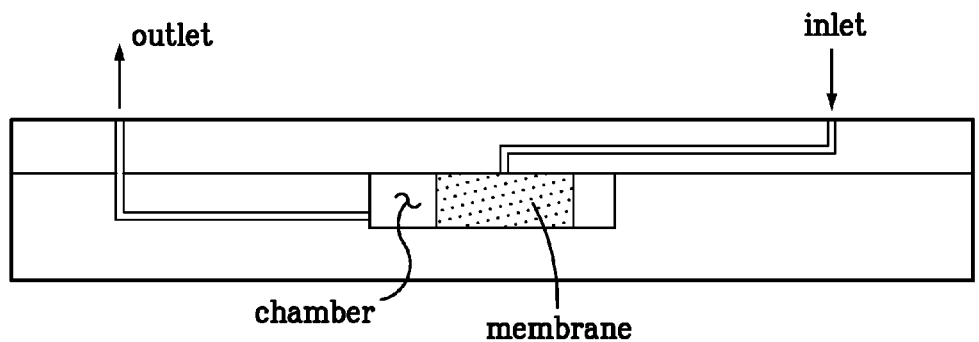
FIG. 19 illustrates a cross-sectional view of single-chamber lysis, nucleic acid isolation, and PCR chip and a photograph of the chip.
Figure 19B:
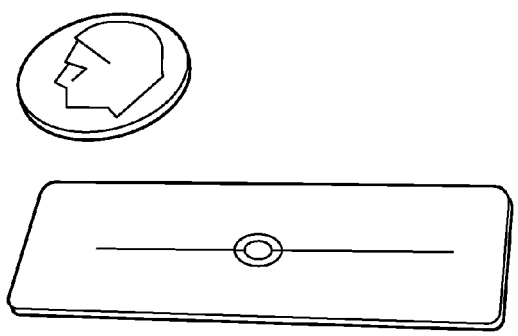

Another version of the chip features two conduits separating the inlet and exit ports from the chamber (FIG. 19).

Figure 20:
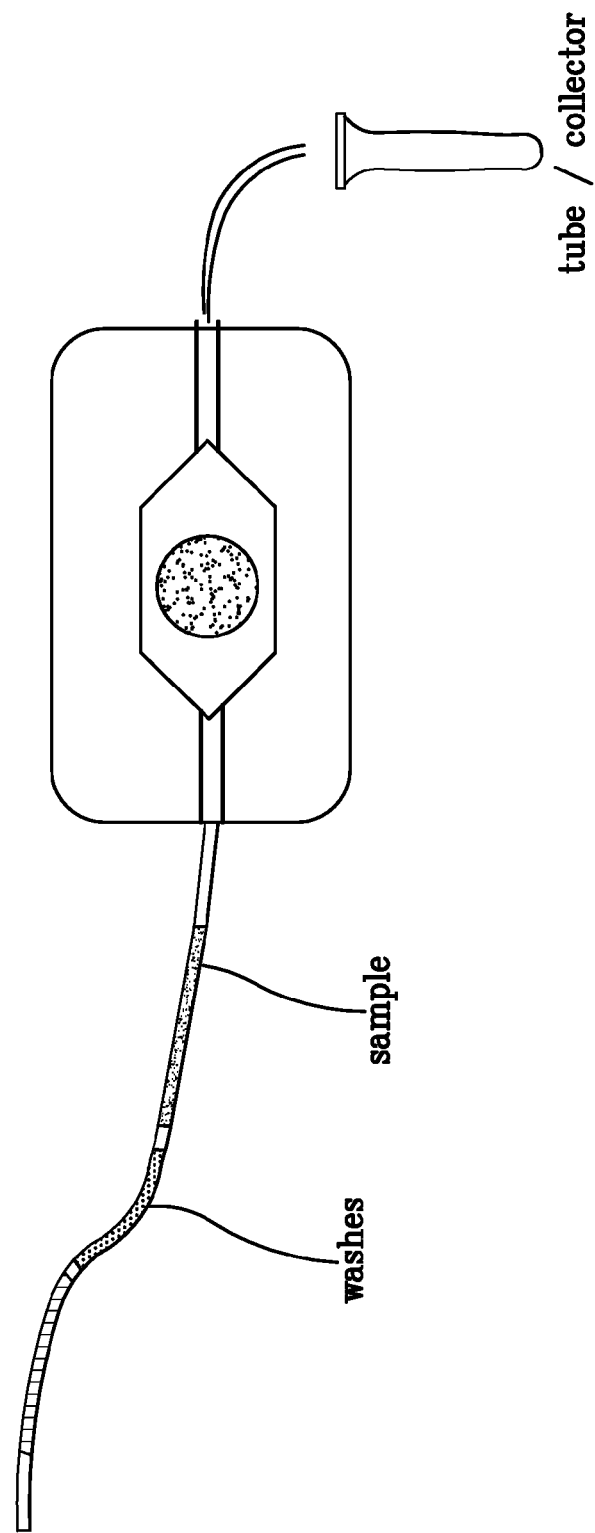
FIG. 20 depicts a chip connected with inlet and outlet tubes for automated sample loading, washes, and PCR reagent hydration.

More automated operation of these chips is feasible. Sample, wash solutions, and water to hydrate the PCR reagents can be continually pumped through the chamber using a manual syringe or programmed syringe pump (FIG. 20).

Working Example 4

Figure 21:
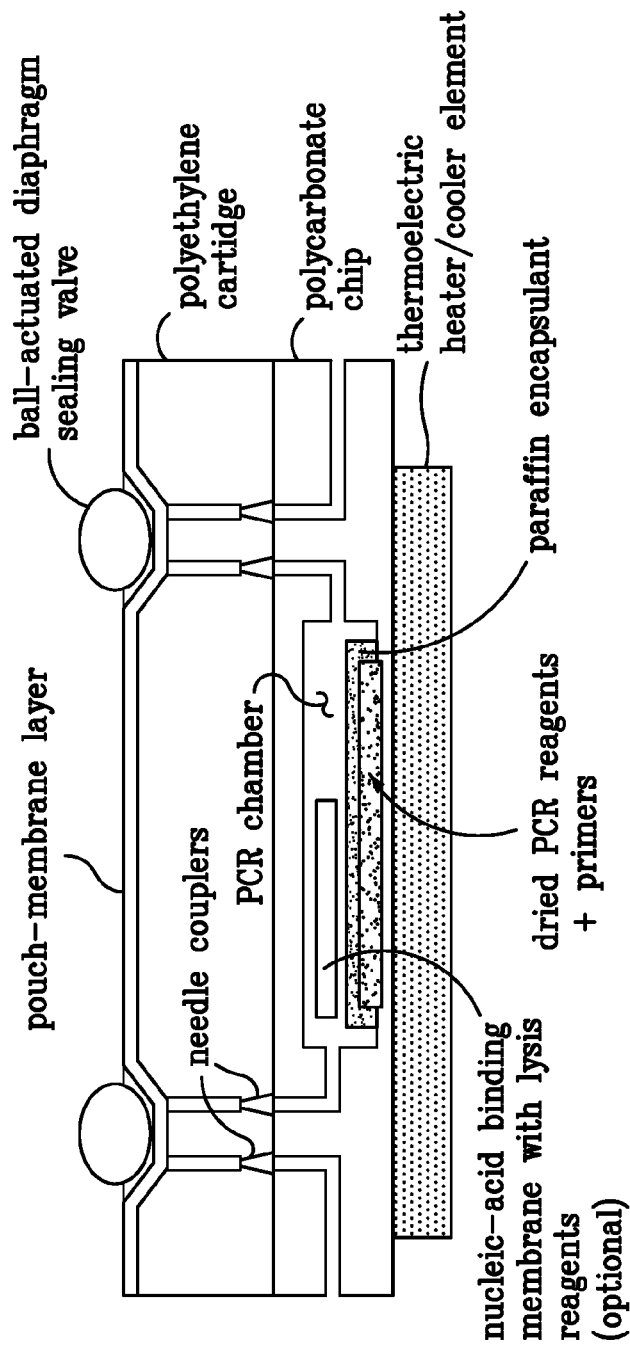
FIG. 21 depicts the integration of single-chamber lysis nucleic acid isolation, and PCR device with microfluidic system.

Single-Chamber Lysis, Nucleic Acid Isolation and PCR Process Integrated into Microfluidic System The single chamber for lysis, nucleic acid isolation, and PCR device can be integrated into a microfluidic system. Shown in FIG. 21 is the single-chamber for lysis, nucleic acid isolation, and PCR containing a nucleic acid binding membrane, and pre-stored, wax-encapsulated dried reagents. In this instance, the PCR chamber is sealed with ball-actuated diaphragm sealing valves. As such, the chamber can be integrated with other microfluidic components and detection devices, as well as with other chambers for simultaneous sample processing for distinct nucleic acid targets to function as a comprehensive diagnostics system with multiplex detection capabilities.

Alternative Binding Medias and Chemistries

The foregoing described chips for lysis, nucleic acid isolation, and PCR using either Whatman FTA™ cellulose filter paper or Whatman Anodisc™ porous alumina oxide as the solid-phase nucleic acid binding media. Table 5 surveys some of the nucleic acid binding media that are deemed good candidates for application to the present invention.

TABLE 5

Nucleic Acid Binding Media

| Media | target | binding agent | washes | elution | PCR compatibity |
|---|---|---|---|---|---|
| silica | DNA | 6M Guanidinium | 50% ethanol solutions | TE buffer | somewhat |
| alumina | DNA | 6M Guanidinium | 200 mM NaCl | N/A | yes |
| Whatman FTA | DNA and RNA | none | FTA buffer TE | N/A | yes |
| silica beads (0.5-2.5 | viral RNA | NH4SO4 Tris acetate Nonidet 40 | Nonidet P40 (0.5%) in Tris-HCl (pH 6.8) | Tris-HCl (pH 8.0) | somewhat |
| silicon carbide particles | bDNA | or water | | | ? |
| photoactivated polycarbonate | gDNA | 3% PEG 0.4 M NaCl 70% EtOH | 85% EtOH | H2O | ? |
| ceramic nanoparticles | | sarcosyl buffer, LiCl, isopropanol | EtOH, NaCl | proprietary buffer | ? |

Customized membranes are also contemplated. In one embodiment, a film of aluminum metal is deposited on a porous support made of polycarbonate or other suitable material such as teflon. The film can be anodized to form a porous alumina layer.

Figure 22:
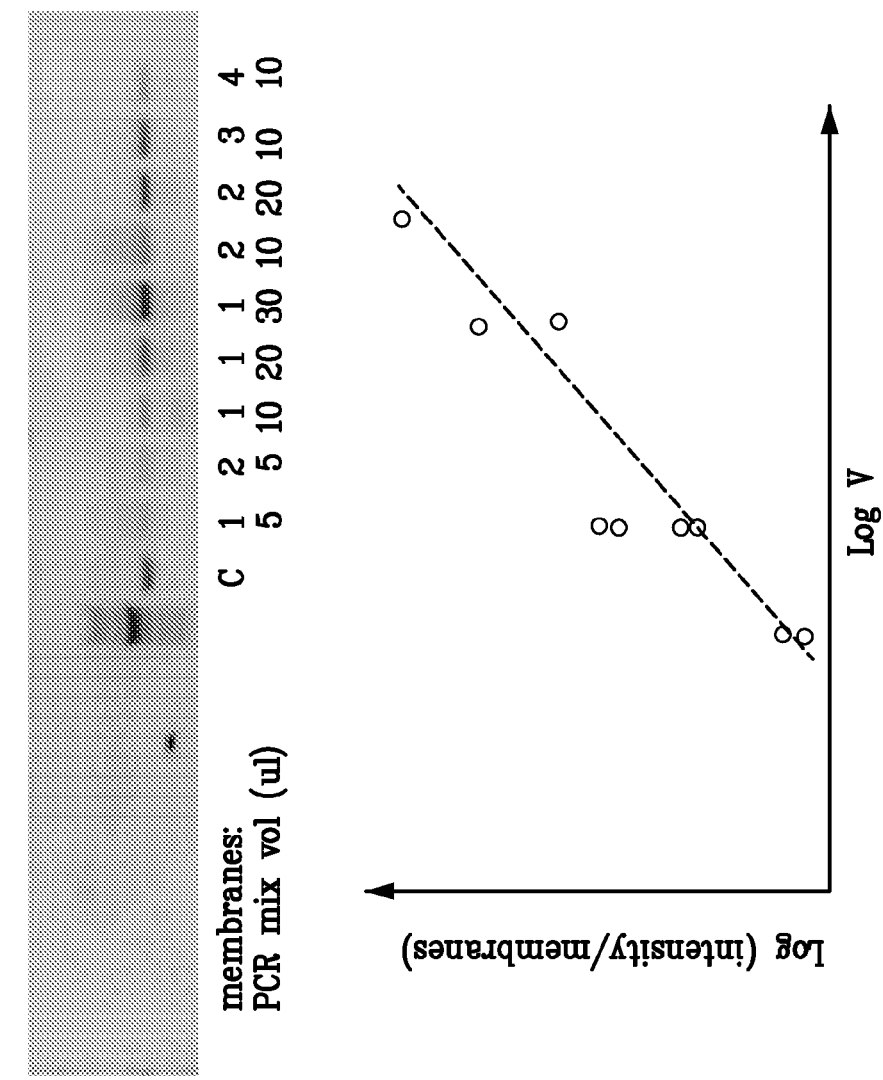
FIG. 22 illustrates the effect of number of 1.2-mm size FTA membranes on PCR reaction volumes of 5, 10, 20, and 30 microliters, a high membrane-to-reaction volume ratio tends to inhibit PCR. PCR reactions in 0.2-ul tubes with approx. 100 ng of DNA template and membrane(s) added.
Figure 23:
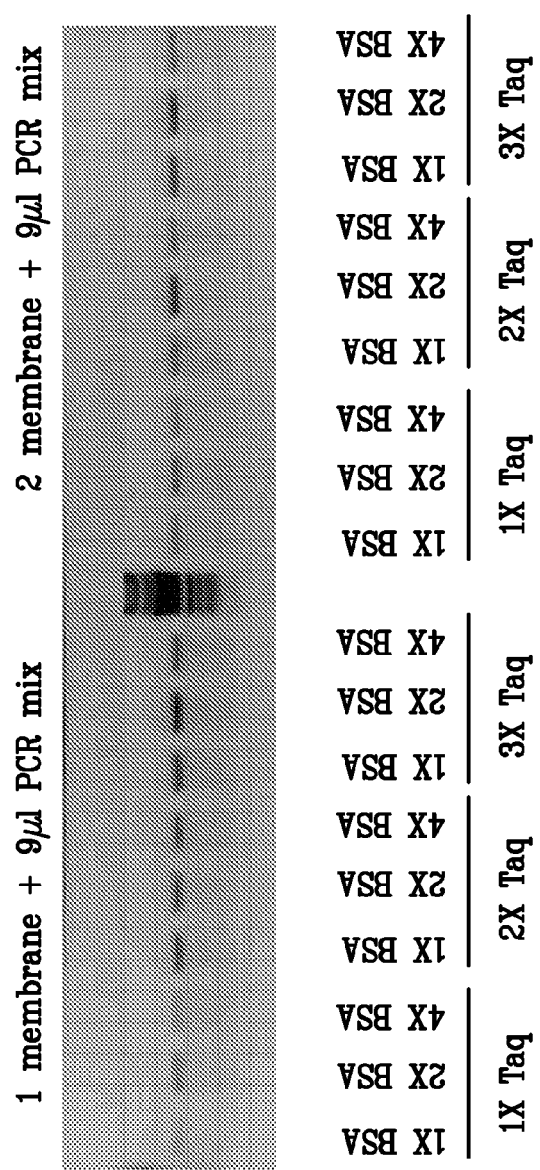
FIG. 23 illustrates the compensating effect of increasing BSA and Taq polymerase concentrations to overcome PCR inhibition of 1.2-mm FTA membranes, PCR reactions in 0.2-ul tubes with approx. 100 ng of DNA template and membrane(s) added.
Figure 24:
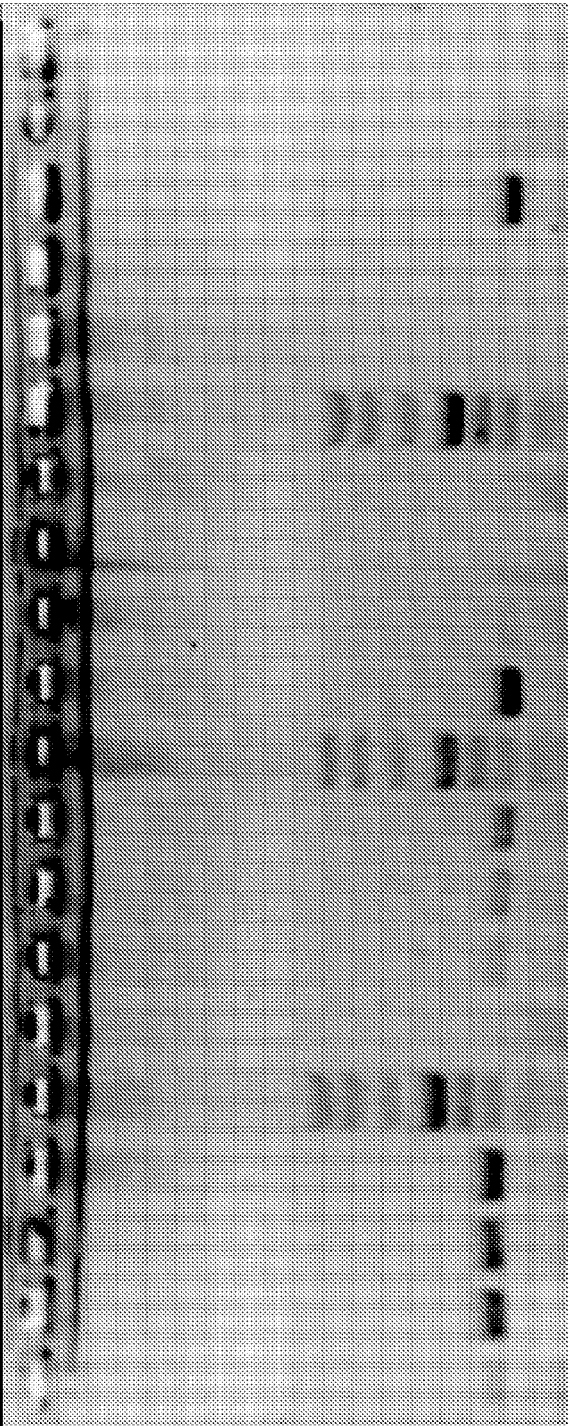
FIG. 24 illustrates the compensating effect of increasing primer, Taq polymerase enzyme, and DNA template concentration to overcome PCR inhibition of 3-mm Whatman Alumina membranes, PCR reactions in 0.2-ul tubes with approx. 100 ng of DNA template and membrane(s) added.

There are several issues for selecting a nucleic acid binding phase. First, is the type of nucleic acid that will bind to the solid phase: e.g., single- or double-stranded DNA, single- or double-stranded RNA; and including its size or origin, e.g., viral DNA or RNA, bacterial or human genomic DNA, ribosomal or messenger RNA, etc. . . . Second, is the binding capacity of the solid phase or membrane (e.g., nanograms or copies of nucleic acid per nanograms or area of binding phase) and the required binding agents (e.g., chaotropic salt). This determines the sizing of the binding phase inserted in the chamber. Third, is the wash solutions used to remove impurities (e.g., ethanol-based solutions or salt solutions.) Some wash solutions, such as ethanol, are PCR inhibitors and complete removal of wash solutions prior to PCR may be problematic. The volume of wash solution used (or number of wash steps) is determined in part by the size of the binding phase. Fourth, is the compatibility of the solid binding phase with the amplification process. Some membrane materials inhibit PCR. This is due, in part, to some combination of adsorption of enzymes, primers, or nucleic acid template to the binding phase such that these components are no longer functional for the amplification reaction. This loss in components due to absorption or immobilization on the binding phase can be compensated by increasing the amount of these materials in the pre-loaded charge of reaction chamber. The PCR inhibition by the membrane can be reduced by decreasing the size of membrane for a given reaction volume. Thus, there is an optimum membrane size since, on the one hand, the membrane size should be large to increase the capture and binding of nucleic acid target from the lysate, but on the other hand, the membrane size should be reduced as much as possible to minimize inhibition of the PCR reaction. Inhibition of PCR by the solid binding phase can also be reduced by adding BSA (bovine serum albumin) or PEG (polyethylene glycol) to the reaction mixture. These additives appear to displace other adsorbed species on the membrane. FIGS. 22-24 summarize some studies investigating PCR inhibition of FTA and alumina membranes.

The binding of nucleic acid template to the solid binding phase may be a crucial issue for some types of membranes. Adding sodium phosphate buffer to the PCR reactions to amplify nucleic acids bound to alumina may reduce adsorption of the nucleic template and enhance PCR amplification.

Integration of Detection Methods with Single-Chamber

Figure 25:
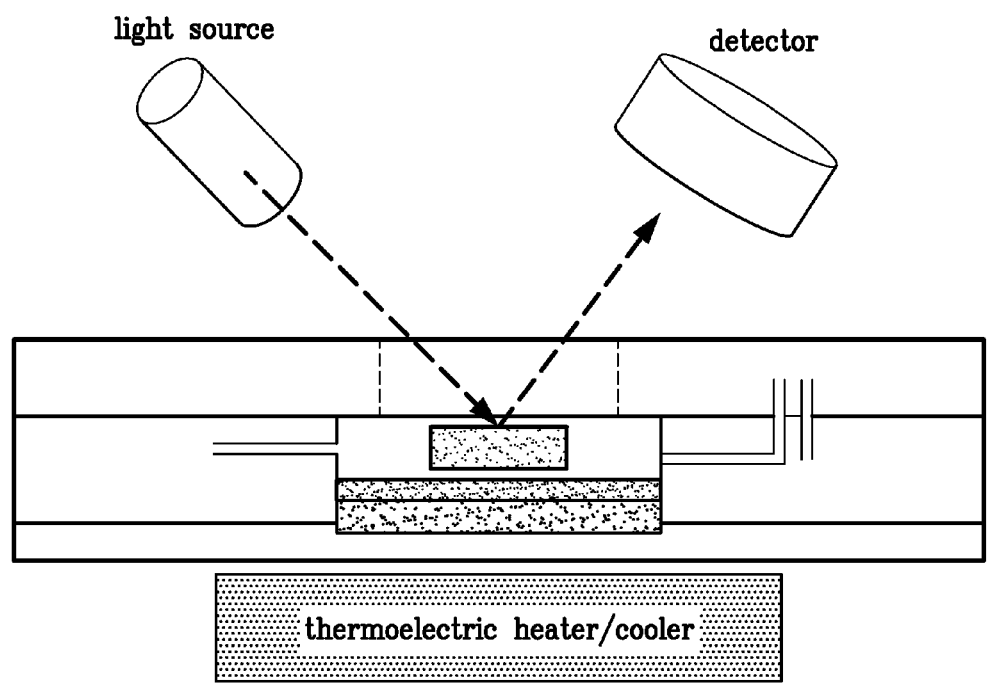
FIG. 25 depicts a single-chamber quantitative PCR device.
Figure 26:
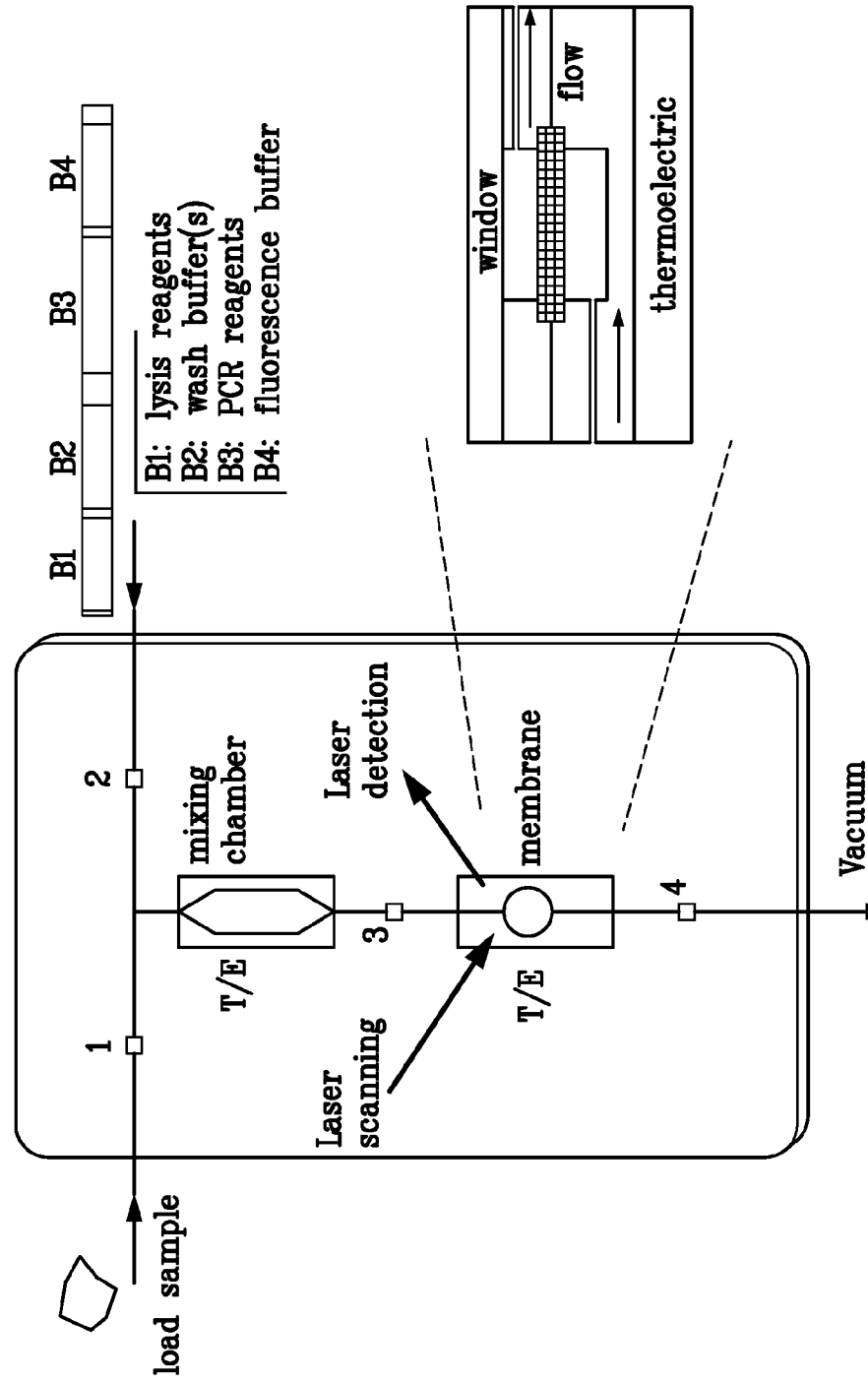
FIG. 26 depicts a single chamber device for lysis, nucleic acid isolation by solid-phase extraction using a nucleic acid binding media in the form of a porous membrane, and real-time PCR or real-time RT-PCR (reverse-transcription PCR)
Figure 27:
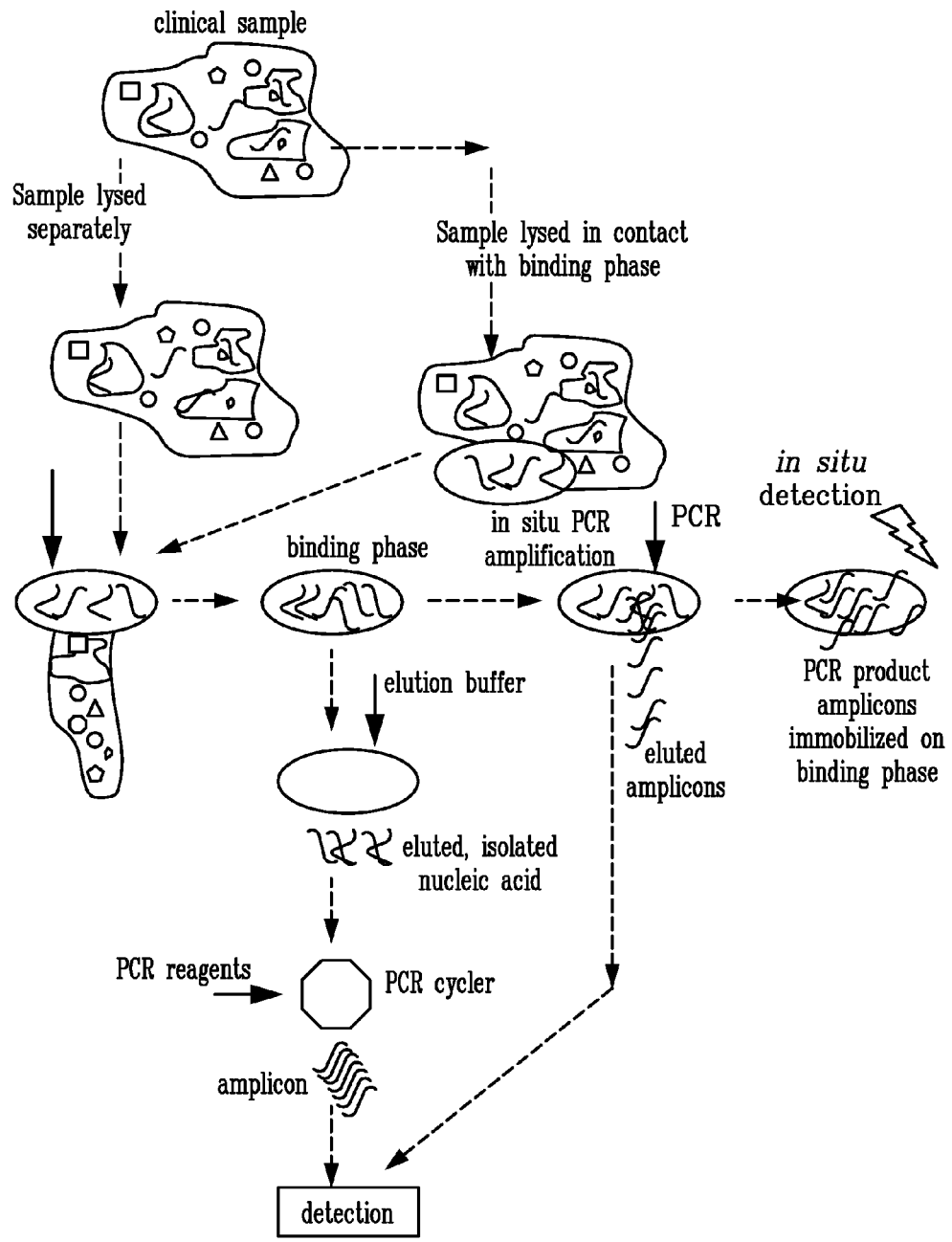
FIG. 27 depicts reaction route options for combining lysis, nucleic acid isolation, amplification, and detection using a solid nucleic acid binding phase.

The entire sample-to-report diagnostics can be integrated into a single-chamber microfluidic process by detecting the PCR product in real time. In real-time PCR(RT-PCR), also called quantitative PCR (q-PCR), a dye that binds to double-stranded DNA (dsDNA) is included in the PCR reaction mix. When the dye is free in solution, its fluorescence is negligible, but when the dye binds to dsDNA, it fluoresces at a characteristic wavelength when excited with UV light. The measured fluorescence tracks the production of PCR product. FIG. 25 shows a schematic cross-sectional view of device configuration for incorporating real-time, in situ fluorescence analysis of the PCR reaction in the single-chamber lysis, nucleic acid isolation, and PCR device. FIG. 26 shows a plan view and cross-sectional view of one particular embodiment of a real-time PCR system for the single-chamber lysis, nucleic acid isolation, and PCR device.

Reverse-Transcription PCR, Other Amplification Techniques, and Sequenced Reactions The invention disclosed here is not limited to the use of PCR for amplifying DNA. The chips can be adapted for reverse-transcription PCR to detect RNA targets such as messenger RNAs and viral RNA. GE Amersham (www.ge.com, Schenectady, N.Y., USA) provides an RT-PCR reagent kit (Ready-To-Go™ RT-PCR beads) which can be used for dry-storage of RT-PCR reagents. Other enzymatic methods of nucleic acid amplification such as Nucleic Acid Sequence Based Amplification (NASBA), Strand Displacement Amplification (SDA) and Transcription Mediated Amplification (TMA) are also feasible, as well as non-enzymatic methods of nucleic amplification or nucleic acid-related signal amplification such as hybrid capture and bio-barcode techniques. Multiplex assays for simultaneous detection of several DNA and RNA targets are also feasible by pre-loading and dry-storing appropriate set of primers in the chip.

For chips that perform several reaction stages (lysis, nucleic acid isolation, reverse transcription, PCR or other types of amplification, as well as labeling and detection), reagents can be dry-stored and encapsulated with paraffin waxes with distinct melting temperatures. For instance, the lysis reagents can be activated by heating the reaction chamber to 40° C. to melt the wax encapsulant coating the lysis reagents and nucleic acid binding reagents. In a similar way, heating of the chamber to 50° C. (for example) would melt the wax encapsulating the reverse-transcription enzyme and reagents, and heating the chamber to 70° C. would melt the wax encapsulating the PCR enzymes and reagents. In this way, a controlled sequence of temperature-activated reactions can be performed in a single chamber. For detection, reagents and enzymes, for enzyme linked immunoassays, could also be stored in the chamber. The enzyme linked assay, including wash steps, could be used to detect PCR products in the same chamber. A calorimetric or fluorescent detection of the enzyme-linked assay could be performed in the chamber, or the product could flushed from the chamber for detection outside the chamber.

What is claimed:

1. A microfluidic chip, comprising:
a chamber having a volume and a width, the chamber being at least partially defined by a substrate,
the chamber comprising an inlet having an effective cross-sectional diameter in the range of from about 1 to about 10,000 microns, and
the chamber comprising an outlet,
a nucleic acid concentrator disposed within the chamber,
the nucleic acid concentrator being porous,
the nucleic acid concentrator spans the cross-section of the chamber such that the nucleic acid concentrator is in fluid communication with both the inlet and the outlet,
the inlet and the outlet being configured such that fluid exerted into the chamber enters the chamber through the inlet, contacts the nucleic acid concentrator, and exits the chamber through the exit;
the nucleic acid concentrator being capable of preferentially and reversibly binding a nucleic acid and the nucleic acid concentrator comprising at least one lysing reagent; and
a polymerase chain reaction reagent disposed within a first heat-sensitive encapsulant disposed within the chamber,
wherein the microfluidic chip is configured to concentrate, amplify, and detect nucleic acid in the chamber, and
wherein the chip is configured to permit contact between a fluid sample introduced to the chamber and the heat-sensitive encapsulant.

2. The microfluidic chip of claim 1, wherein the microfluidic chip is capable of accommodating all steps of a polymerase chain reaction performed on a cellular sample.

3. The microfluidic chip of claim 1, wherein the inlet comprises a cross-sectional dimension in the range of from about 10 to about 1000 microns.

4. The microfluidic chip of claim 1, wherein the inlet comprises a cross-sectional dimension in the range of from about 50 to about 200 microns.

5. The microfluidic chip of claim 1, wherein the outlet comprises a cross-sectional dimension in the range of from about 1 to about 10,000 microns.

6. The microfluidic chip of claim 1, wherein the outlet comprises a cross-sectional dimension in the range of from about 10 to about 1000 microns.

7. The microfluidic chip of claim 1, wherein the outlet comprises a cross-sectional dimension in the range of from about 50 to about 500 microns.

8. The microfluidic chip of claim 1, wherein the chamber comprises an observation port.

9. The microfluidic chip of claim 1, wherein the substrate comprises a polymer, a metal, a metal oxide, a ceramic, a glass, or any combination thereof.

10. The microfluidic chip of claim 1, wherein the chamber comprises one or more valves capable of modulating fluid flow within the chamber.

11. The microfluidic chip of claim 1, wherein fluid flow across the inlet is modulated by a valve.

12. The microfluidic chip of claim 1, wherein fluid flow across the outlet is modulated by a valve.

13. The microfluidic chip of claim 1, wherein the nucleic acid concentrator comprises a membrane.

14. The microfluidic chip of claim 1, wherein the nucleic acid concentrator comprises silica, alumina, nitrocellulose, an oxide-coated polymer, or any combination thereof.

15. The microfluidic chip of claim 1, wherein a lysing reagent comprises a chaotropic agent, urea, guanidine, or any combination thereof.

16. The microfluidic chip of claim 1, wherein the chamber has disposed within it an enzyme, a nucleic acid, a nucleic acid primer, a biological material, a buffer, a salt, a deoxyribonucleotide, a preservative, or any combination thereof.

17. The microfluidic chip of claim 1, further comprising a heater capable of heating material residing within the chamber.

18. The microfluidic chip of claim 17, wherein the heater comprises a thermoelectric heater.

19. The microfluidic chip of claim 1, further comprising a source of microwave radiation capable of irradiating material residing within the chamber.

20. The microfluidic chip of claim 1, further comprising a source of ultraviolet radiation, infrared radiation, or both, capable of illuminating material residing within the chamber.

21. The microfluidic chip of claim 1, wherein the encapsulant comprises a wax.

22. The microfluidic chip of claim 1, wherein the nucleic acid concentrator comprises a disc.

23. The microfluidic chip of claim 1, wherein the nucleic acid concentrator is disposed so as to divide the chamber into first and second regions, and the encapsulant is enclosed within one region of the chamber.

24. The microfluidic chip of claim 1, wherein the nucleic acid concentrator occupies less than the entire width of the chamber.

25. The microfluidic chip of claim 1, further comprising a second heat-sensitive encapsulant disposed within the chamber, the second heat-sensitive encapsulant having a melting temperature that differs from the melting temperature of the first heat-sensitive encapsulant.

26. The microfluidic chip of claim 1, wherein the chamber is defined entirely by parts that are fixed in position relative to one another.

27. The microfluidic chip of claim 26, wherein the inlet and the outlet are in fluid communication with the first heat sensitive encapsulant such that fluid introduced through the inlet contacts the first heat sensitive encapsulant before flowing to the outlet.

28. The microfluidic chip of claim 1, wherein the inlet and the outlet are in fluid communication with the first heat sensitive encapsulant such that fluid introduced through the inlet contacts the first heat sensitive encapsulant before flowing to the outlet.

29. The microfluidic chip of claim 1, wherein the chamber is defined by at least two planar substrates.

30. The microfluidic chip of claim 1, wherein the inlet and the outlet together define a single axis along which both the inlet and the outlet extend.

* * * * *

SEQUENCE LISTING

<160> NUMBER OF SEQ ID NOS: 2

<210> SEQ ID NO 1
<211> LENGTH: 24
<212> TYPE: DNA
<213> ORGANISM: Artificial Sequence
<220> FEATURE:
<223> OTHER INFORMATION: Oligonucleotide primer

<400> SEQUENCE: 1
aaggyycaaa agatggtatt cagg                                    24

<210> SEQ ID NO 2
<211> LENGTH: 22
<212> TYPE: DNA
<213> ORGANISM: Artificial Sequence
<220> FEATURE:
<223> OTHER INFORMATION: Oligonucleotide primer

<400> SEQUENCE: 2
tctcgcttca ctattcccaa gt                                      22